G. W. GWINN.
MACHINE FOR PACKAGING MATERIALS.
APPLICATION FILED DEC. 29, 1914.
1,221,313.
Patented Apr. 3, 1917.
20 SHEETS—SHEET 19.
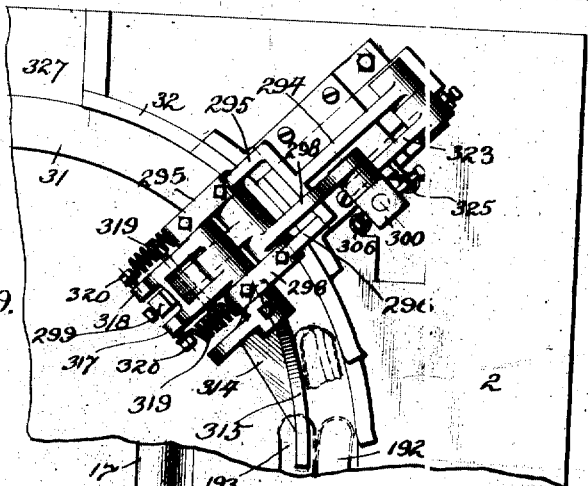
Fig. 59.
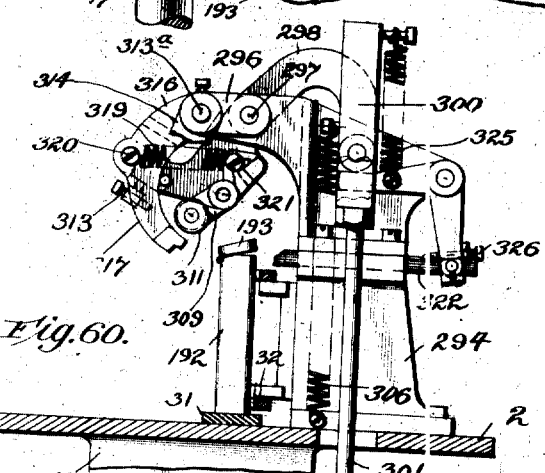
Fig. 60.
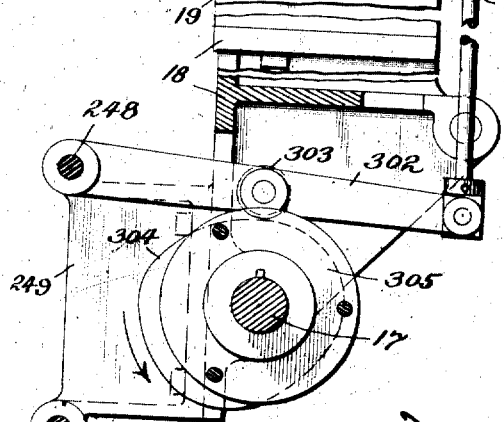
Inventor
George W. Gwinn,
By Dodge and Sons,
Attorneys
Witnesses

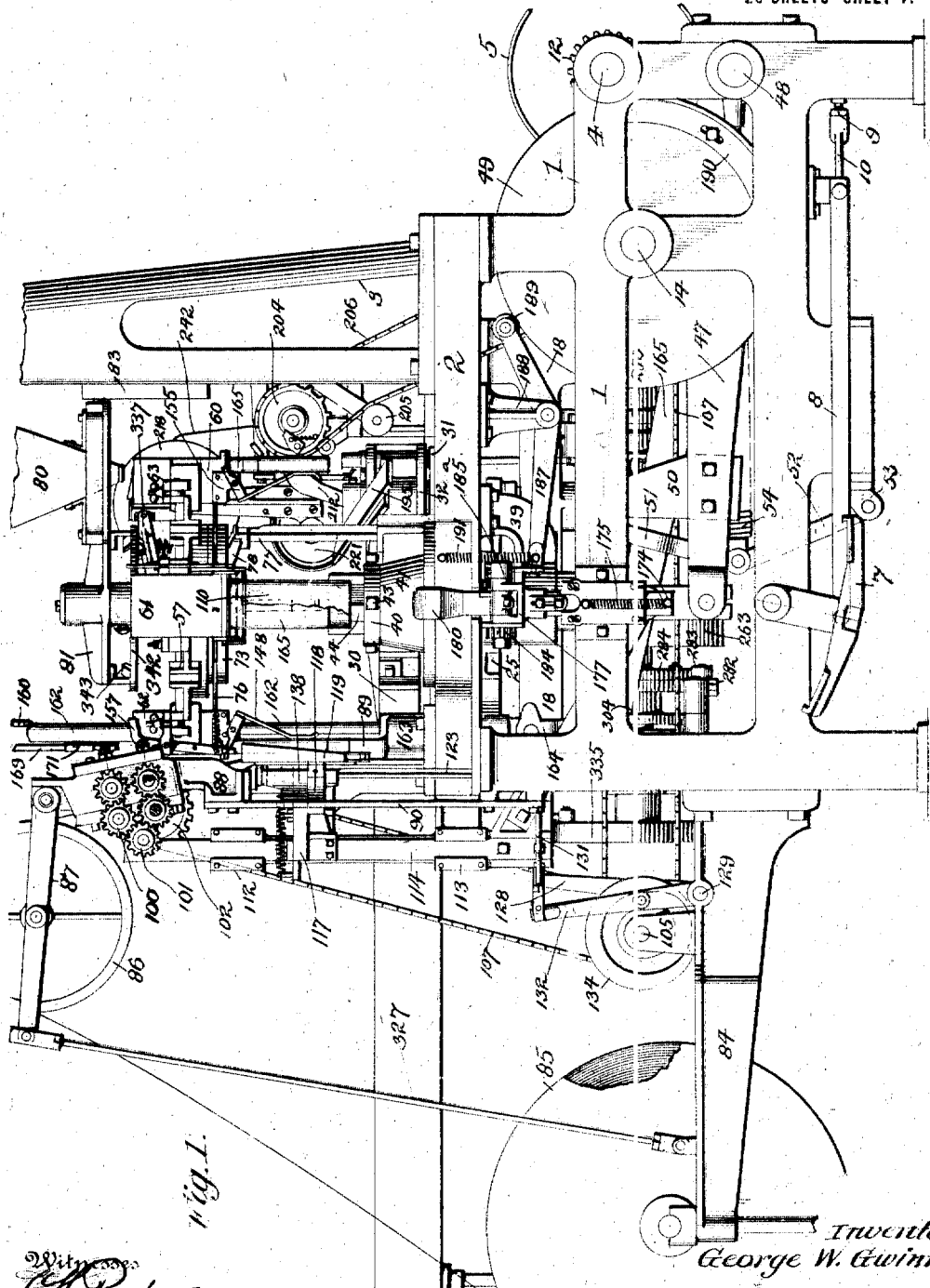

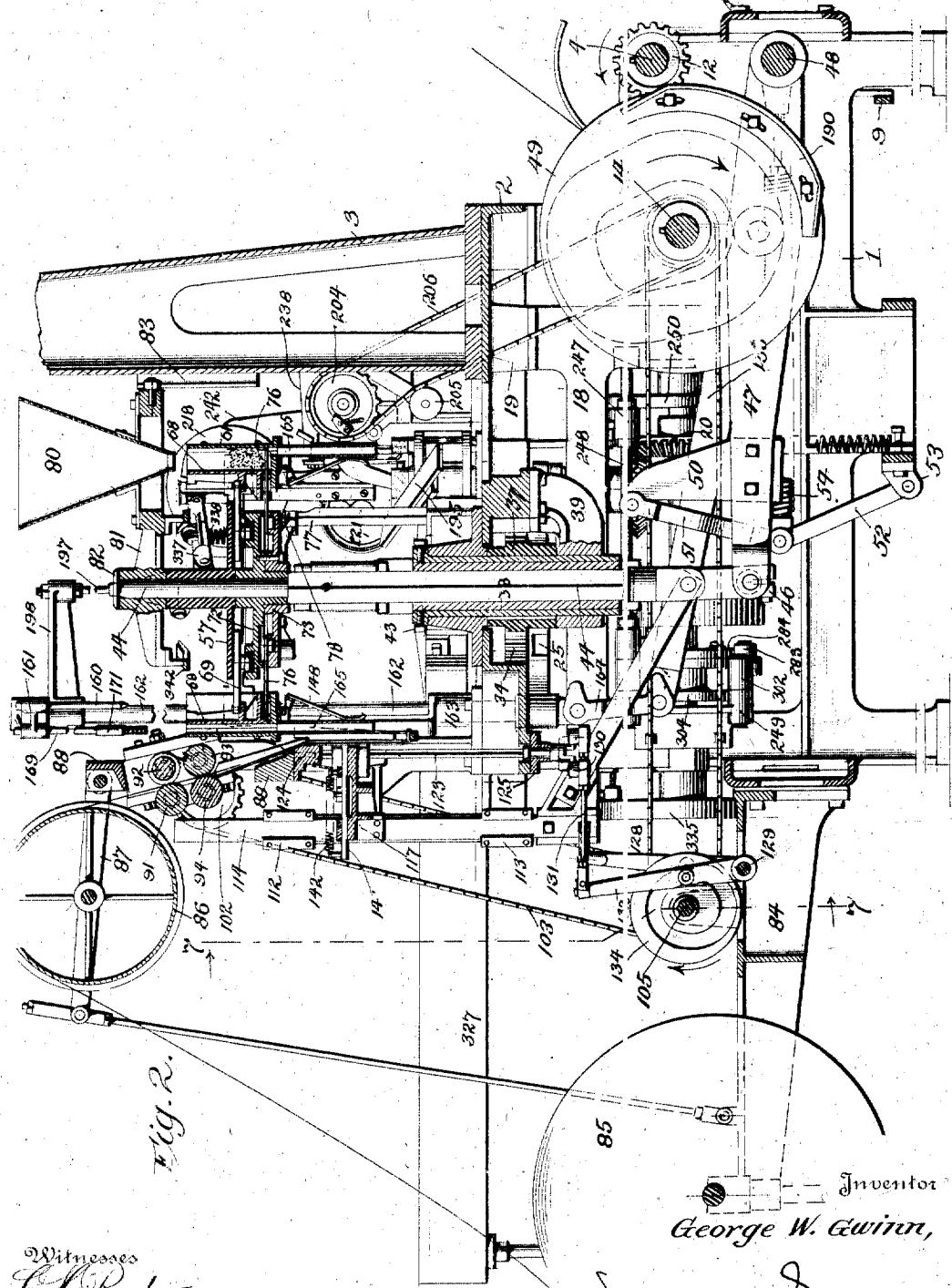

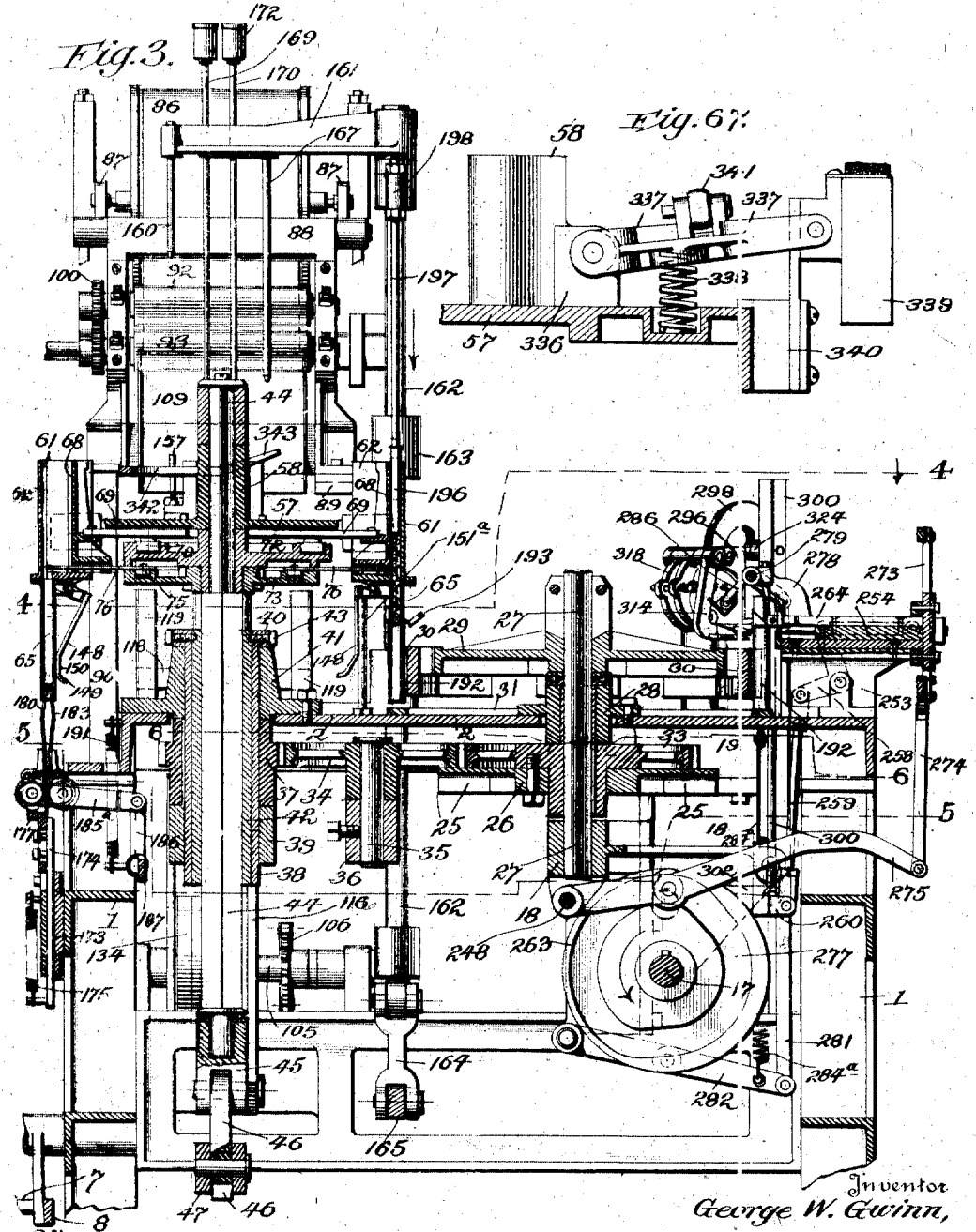

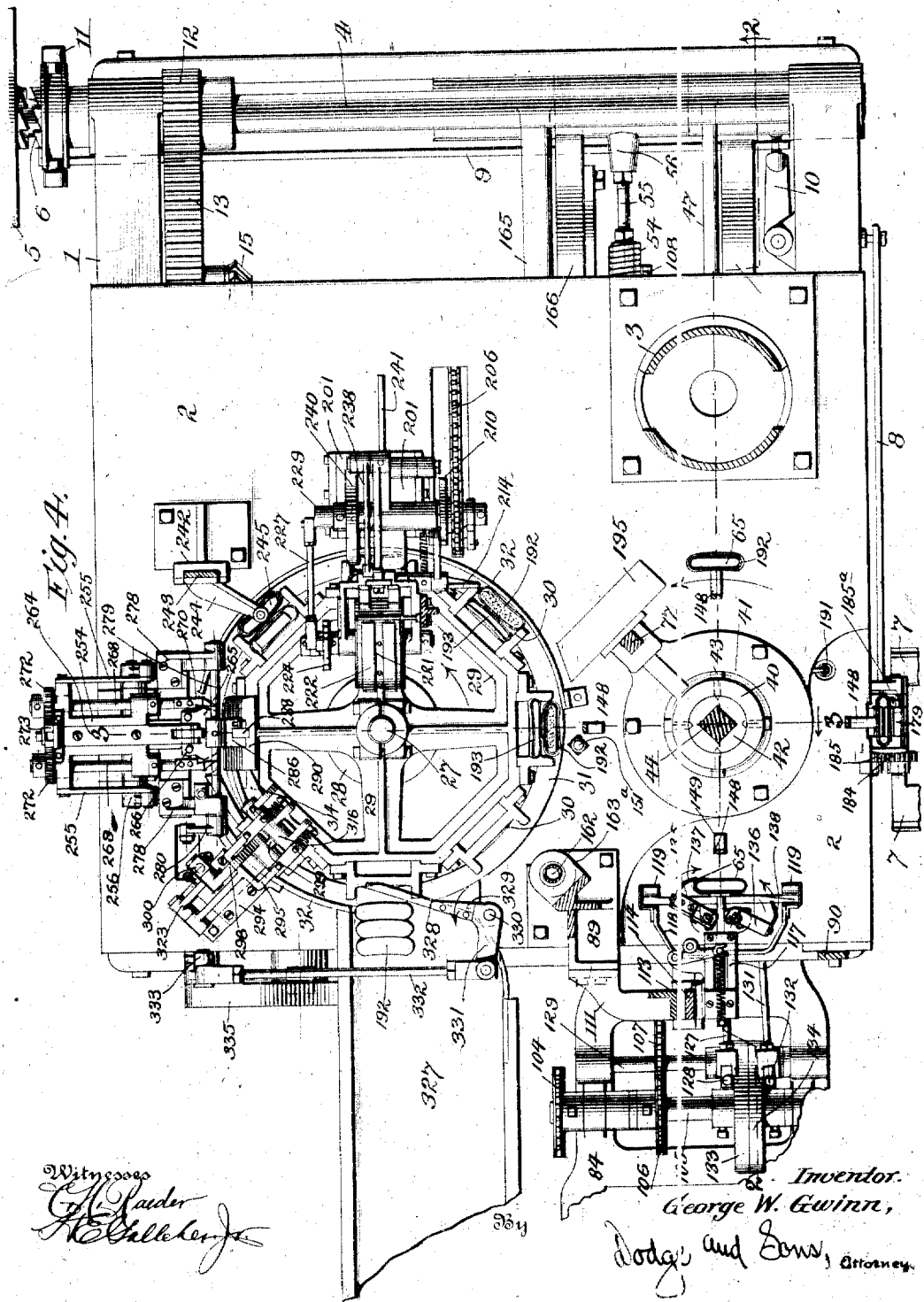

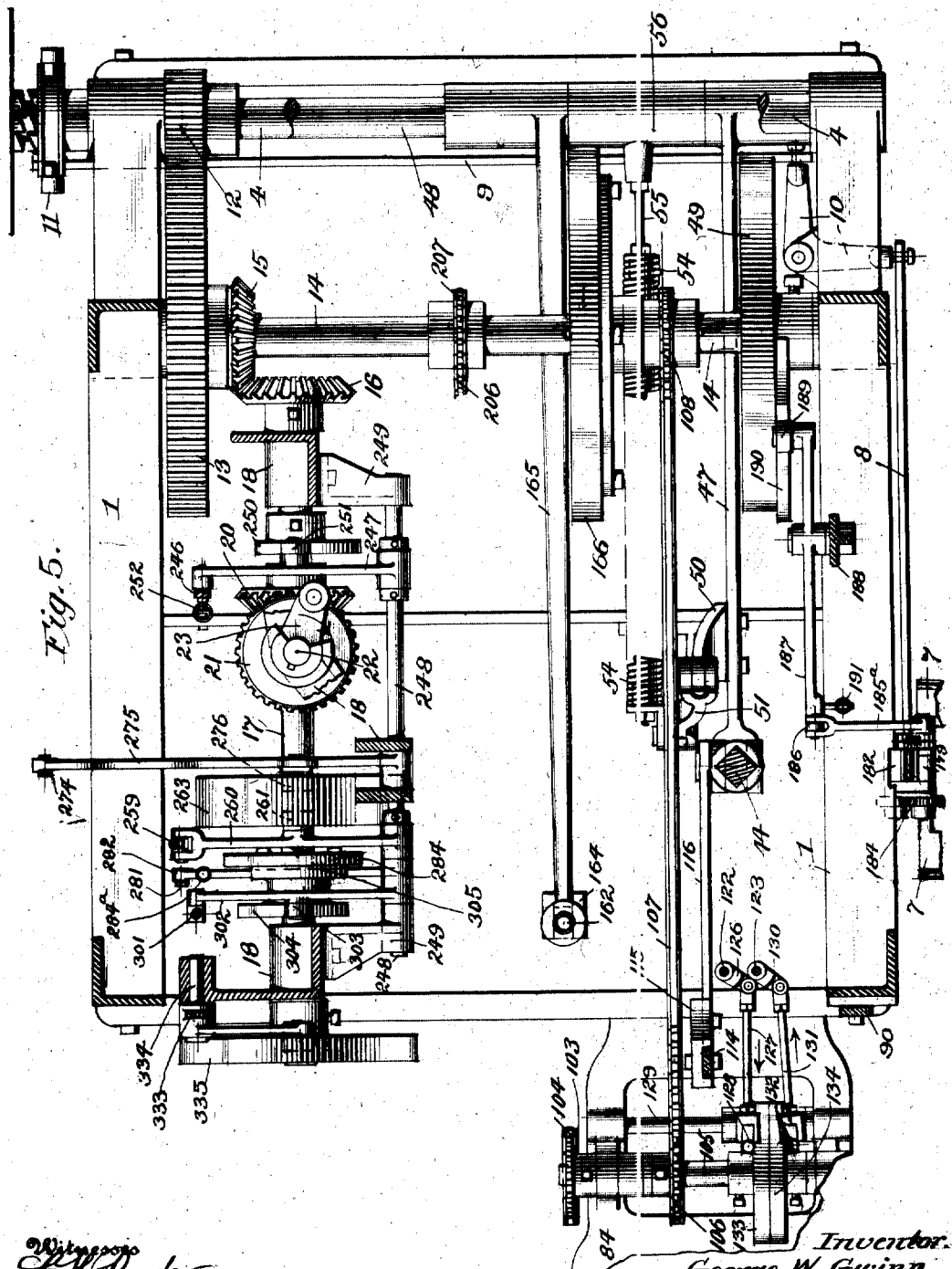

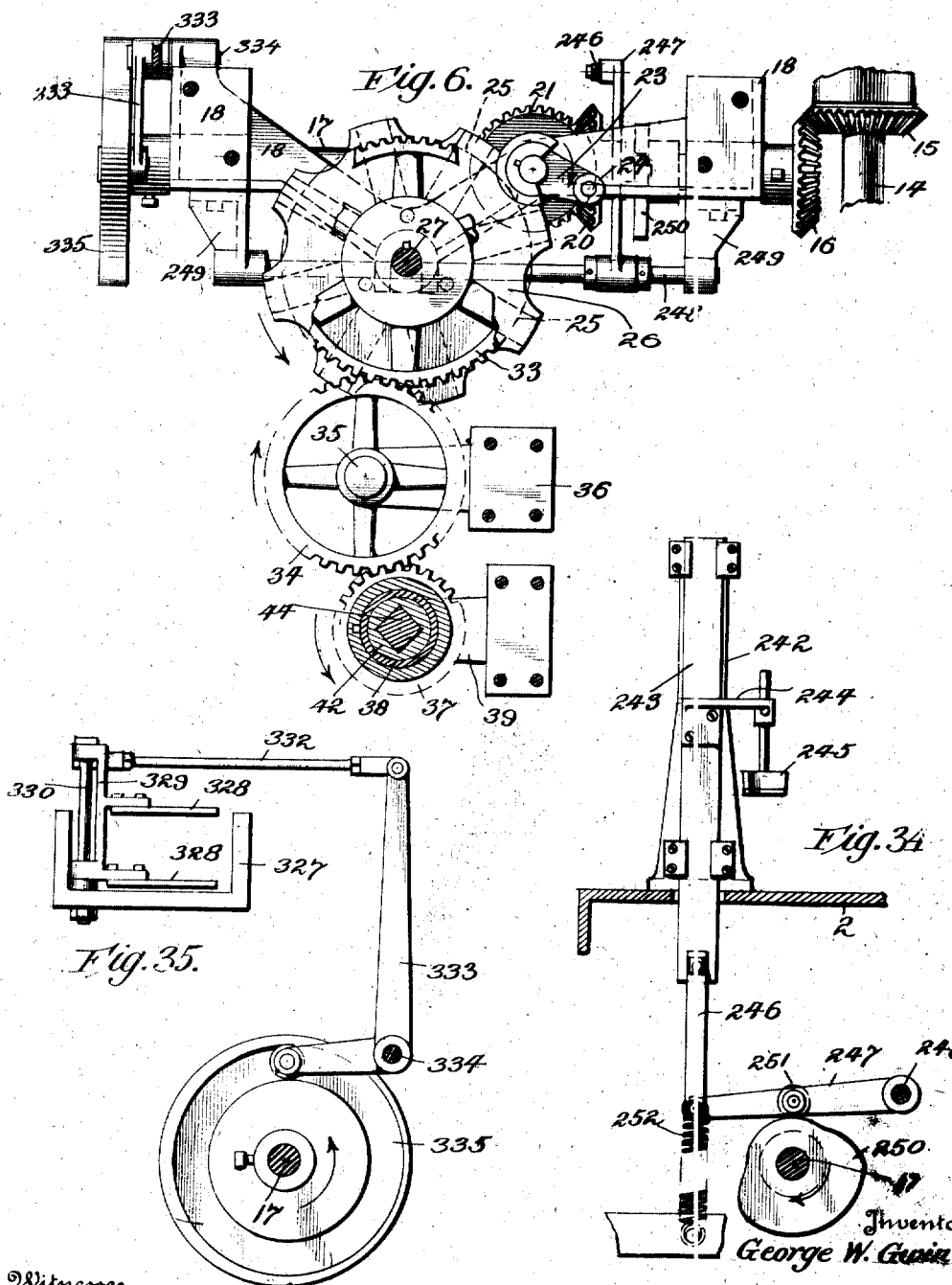

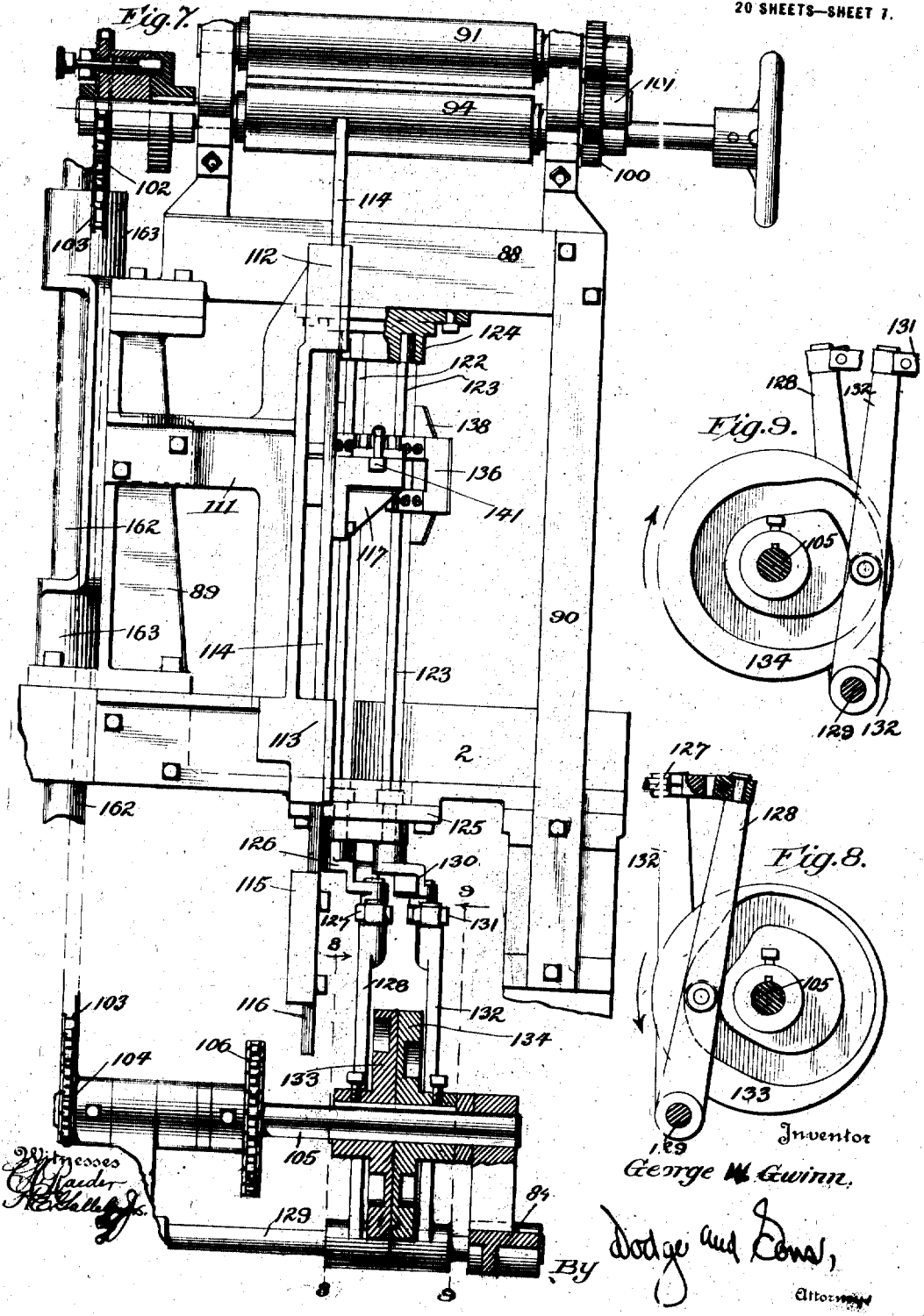

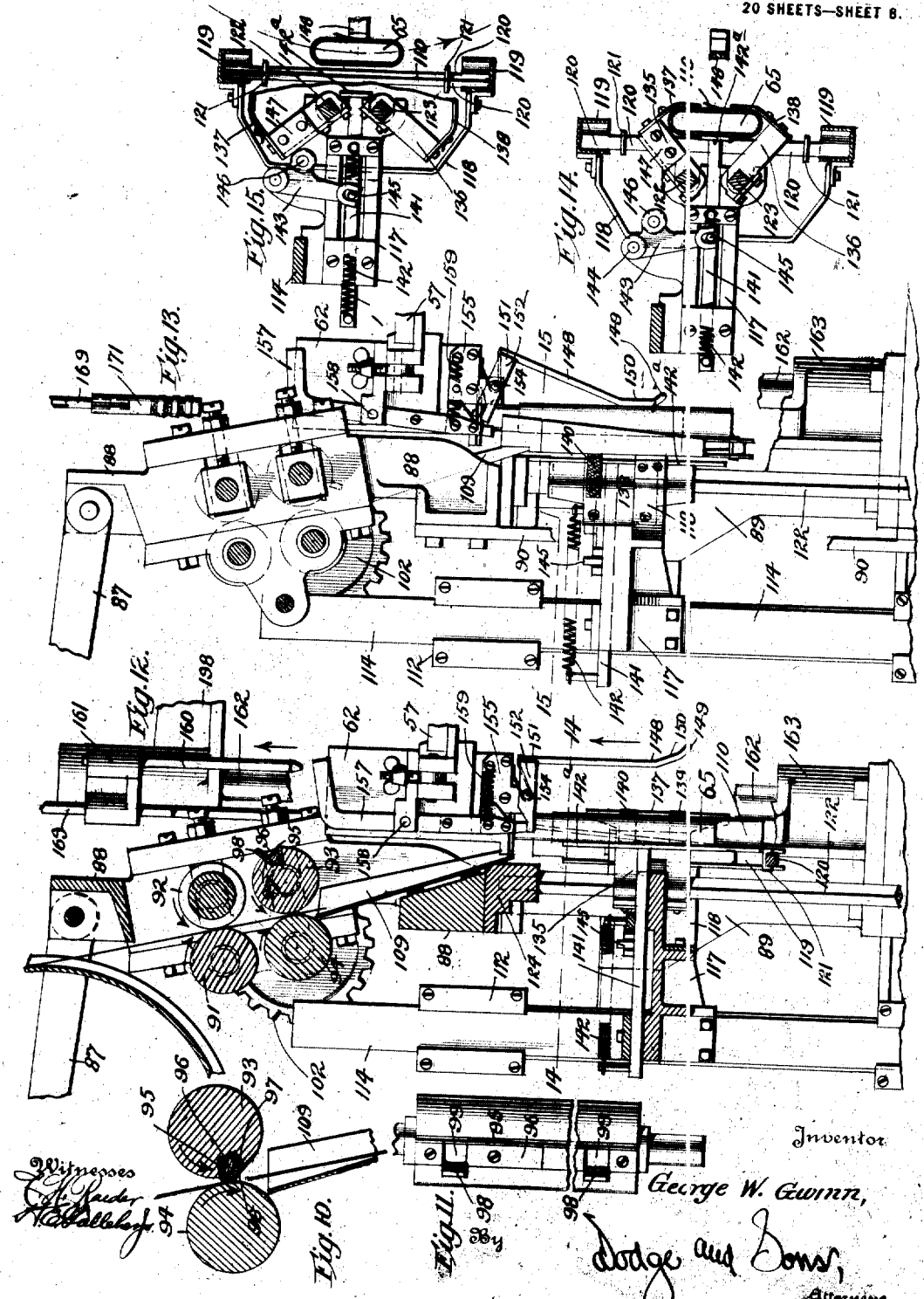

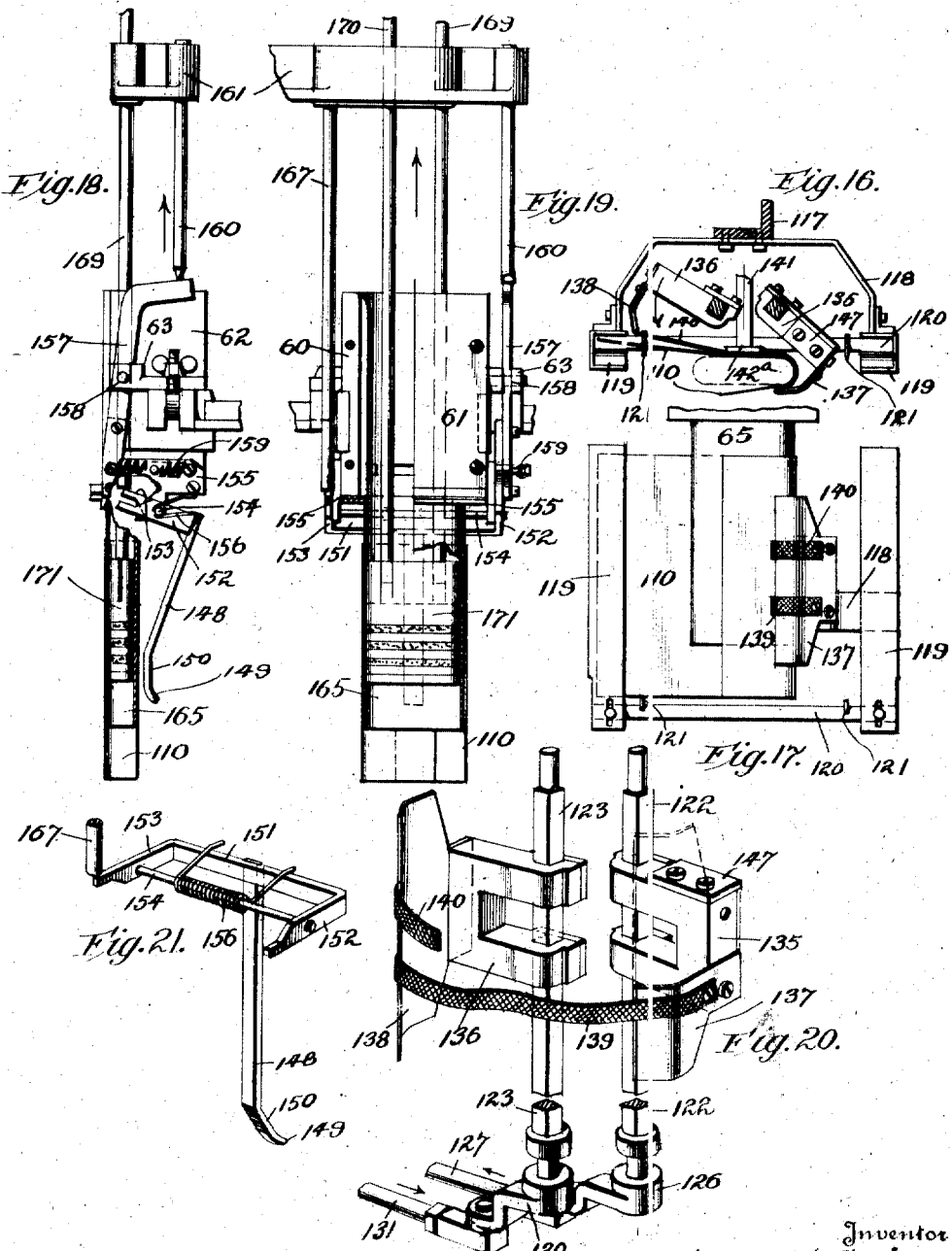

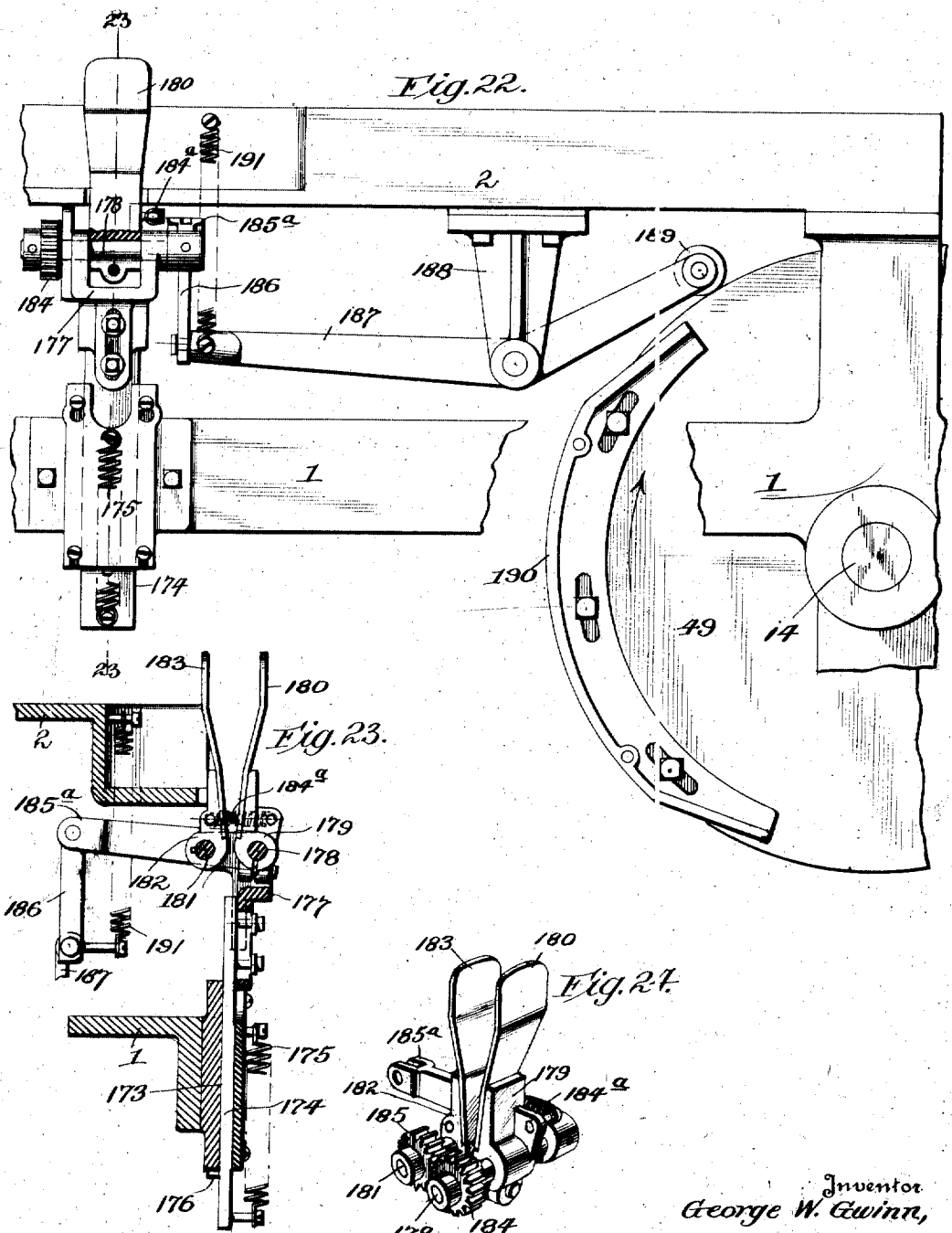

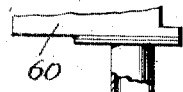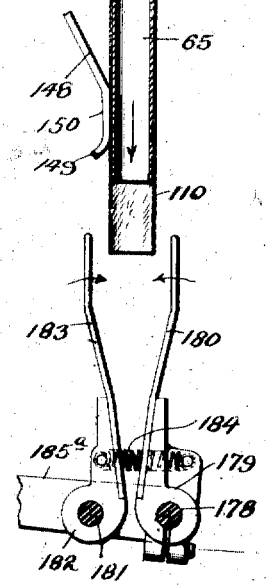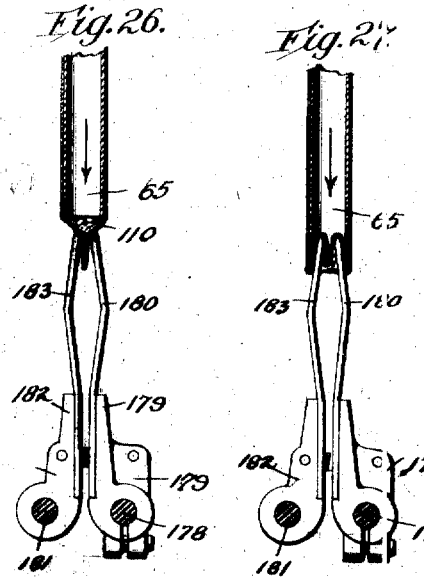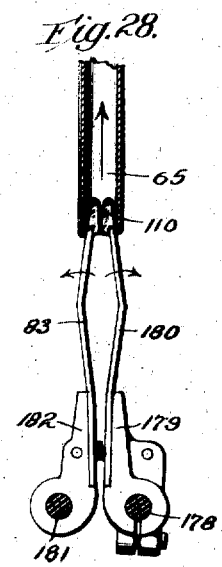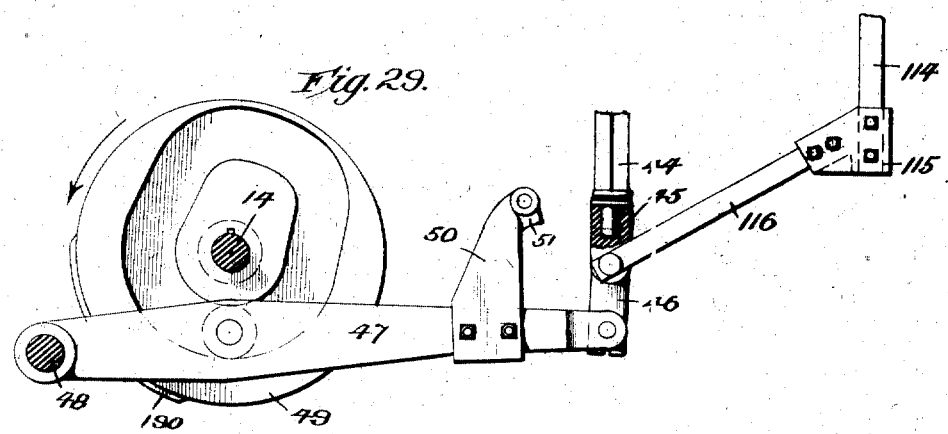

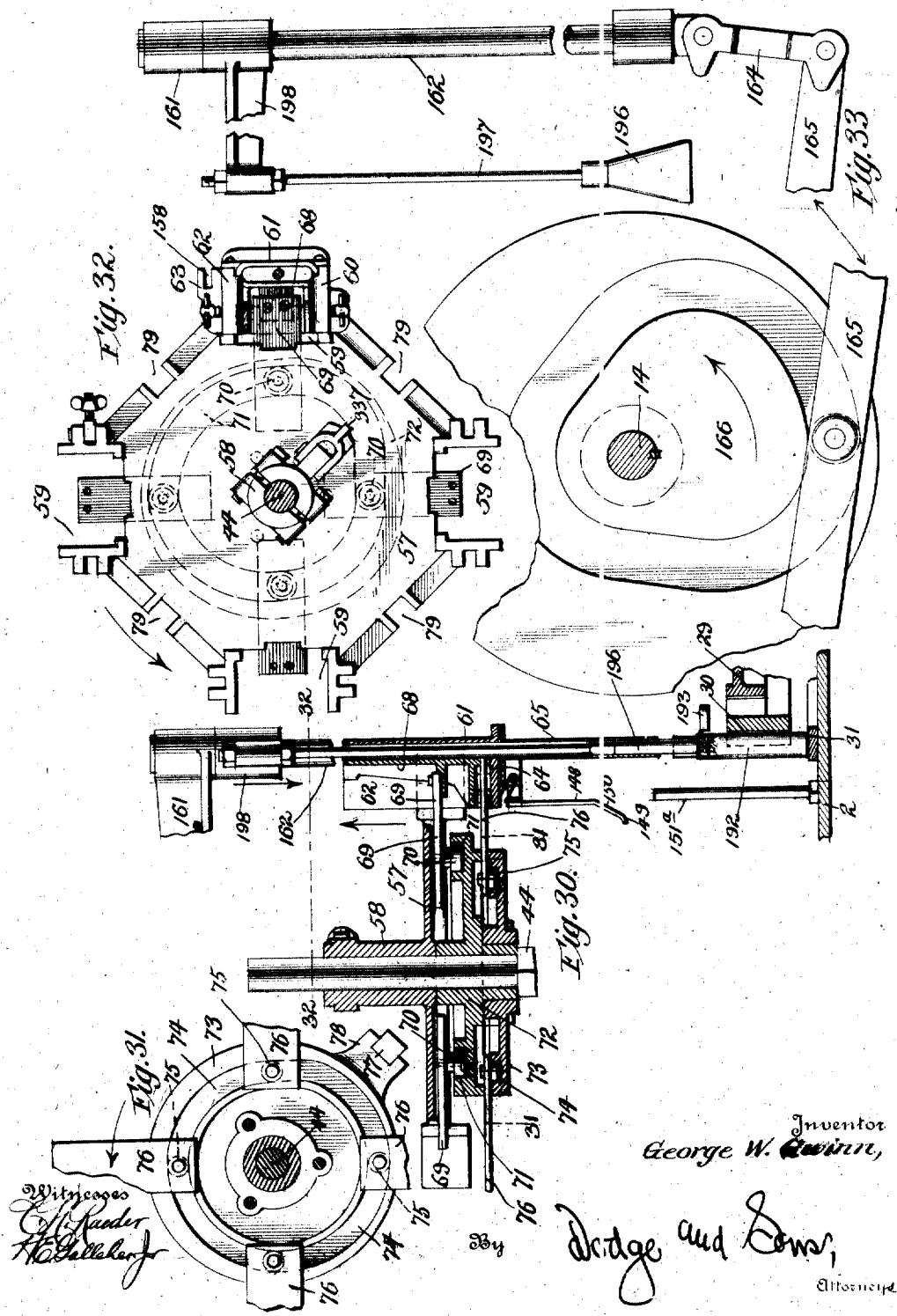

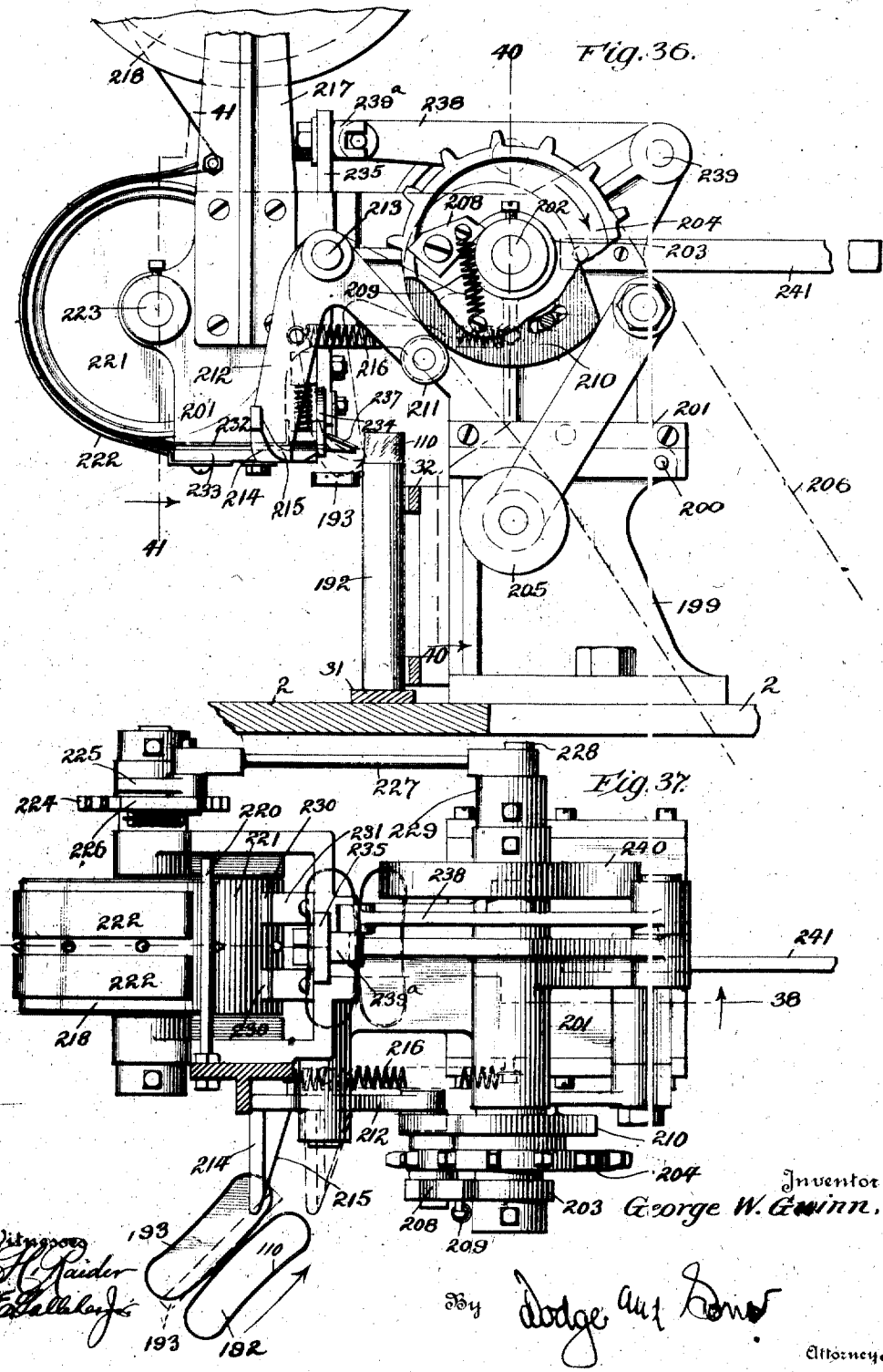

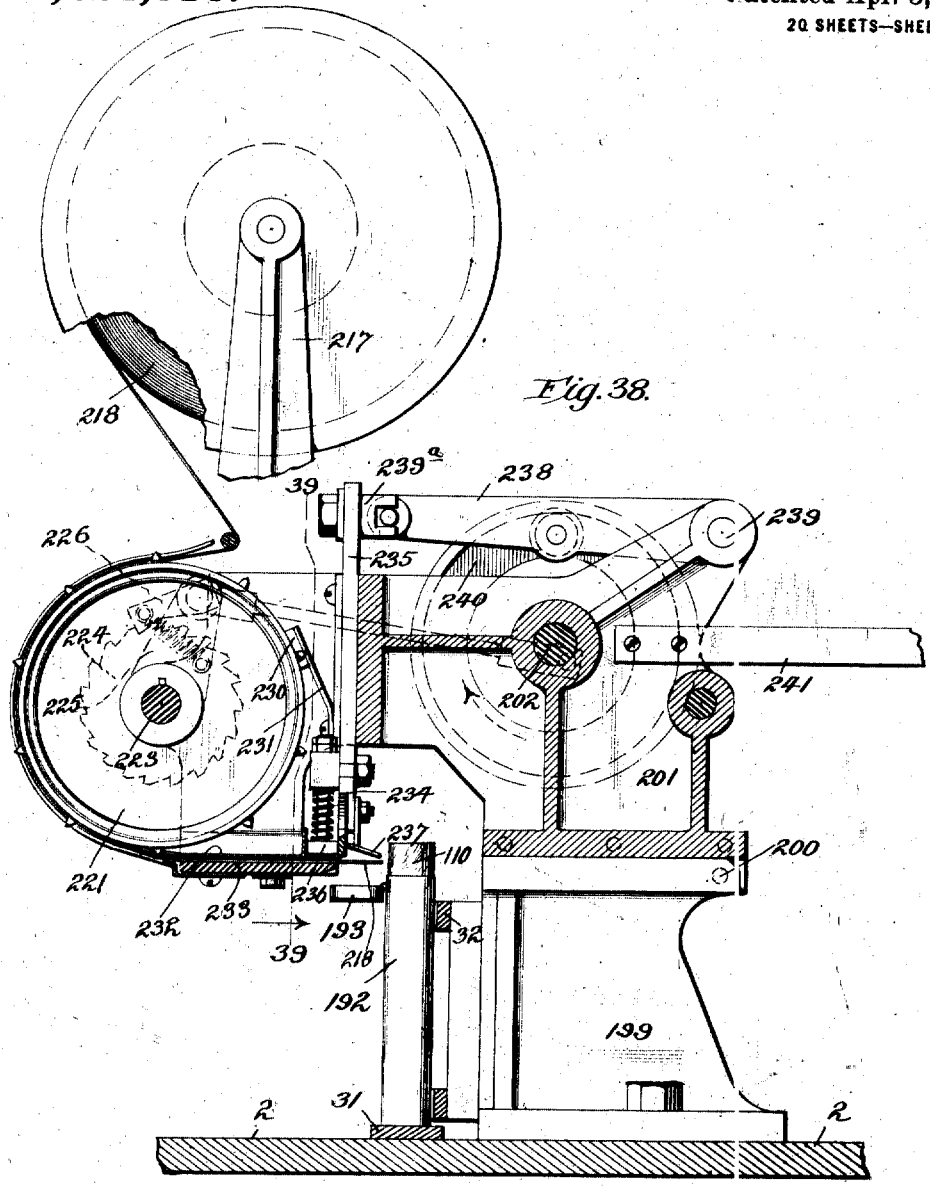

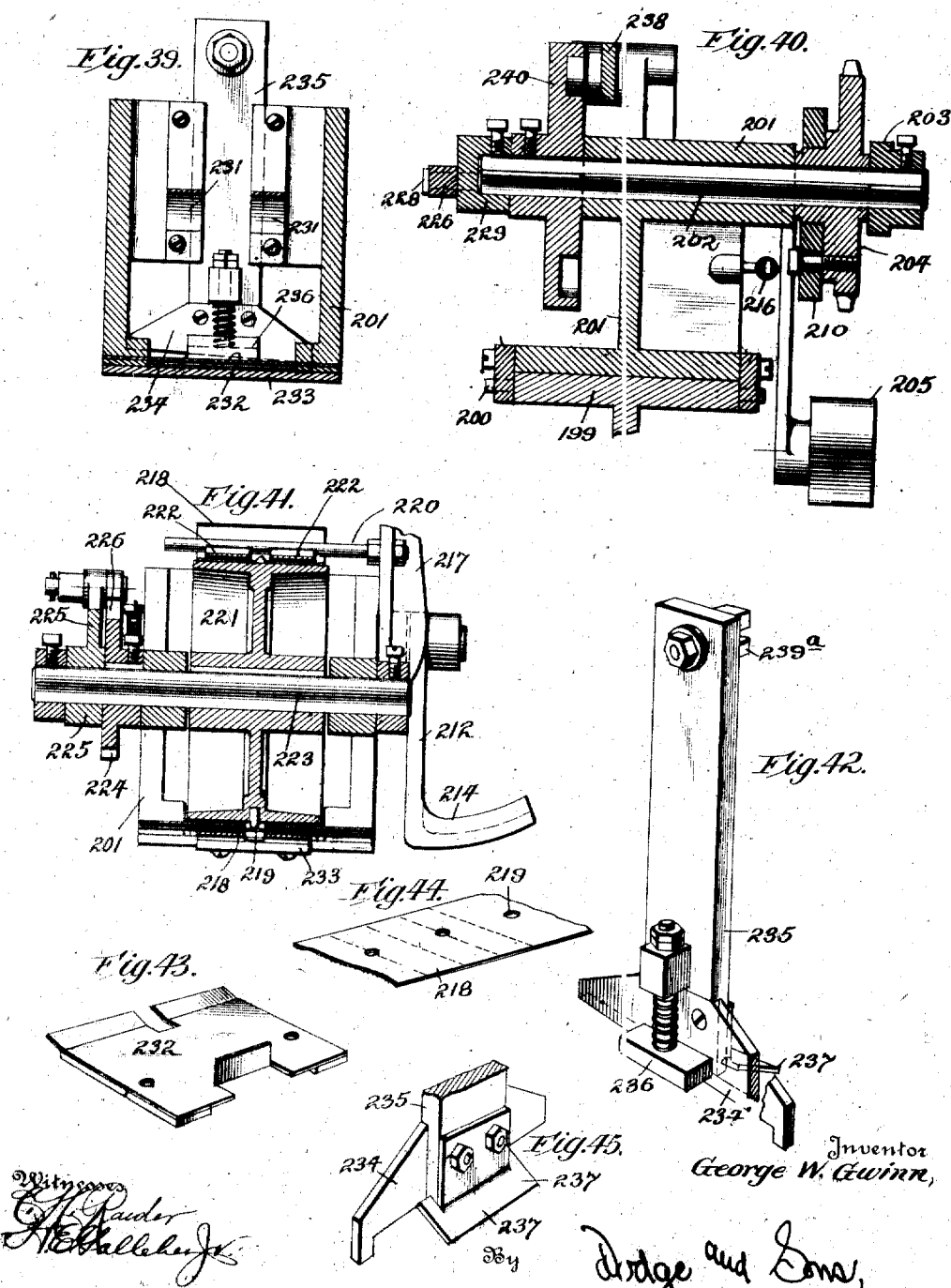

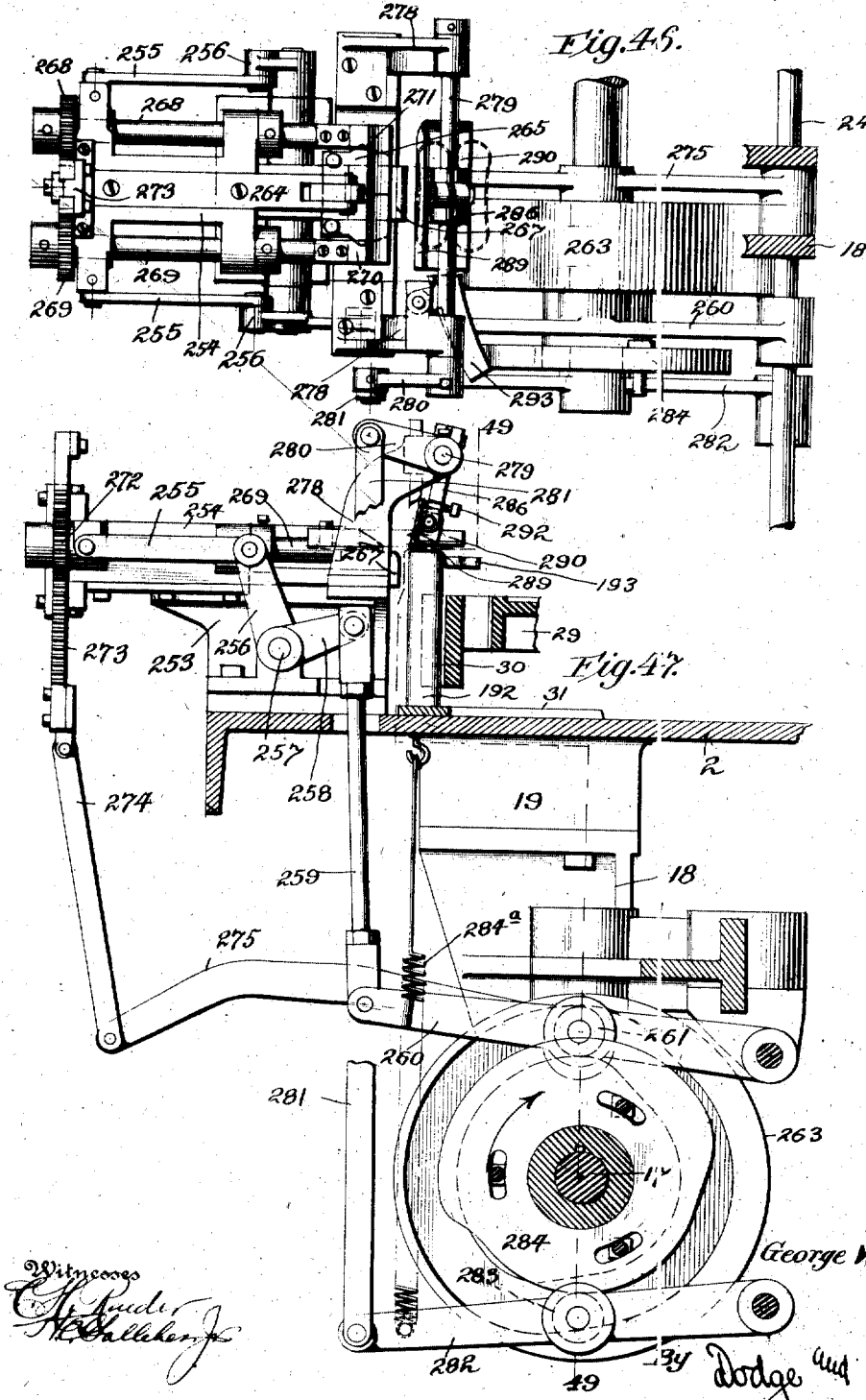

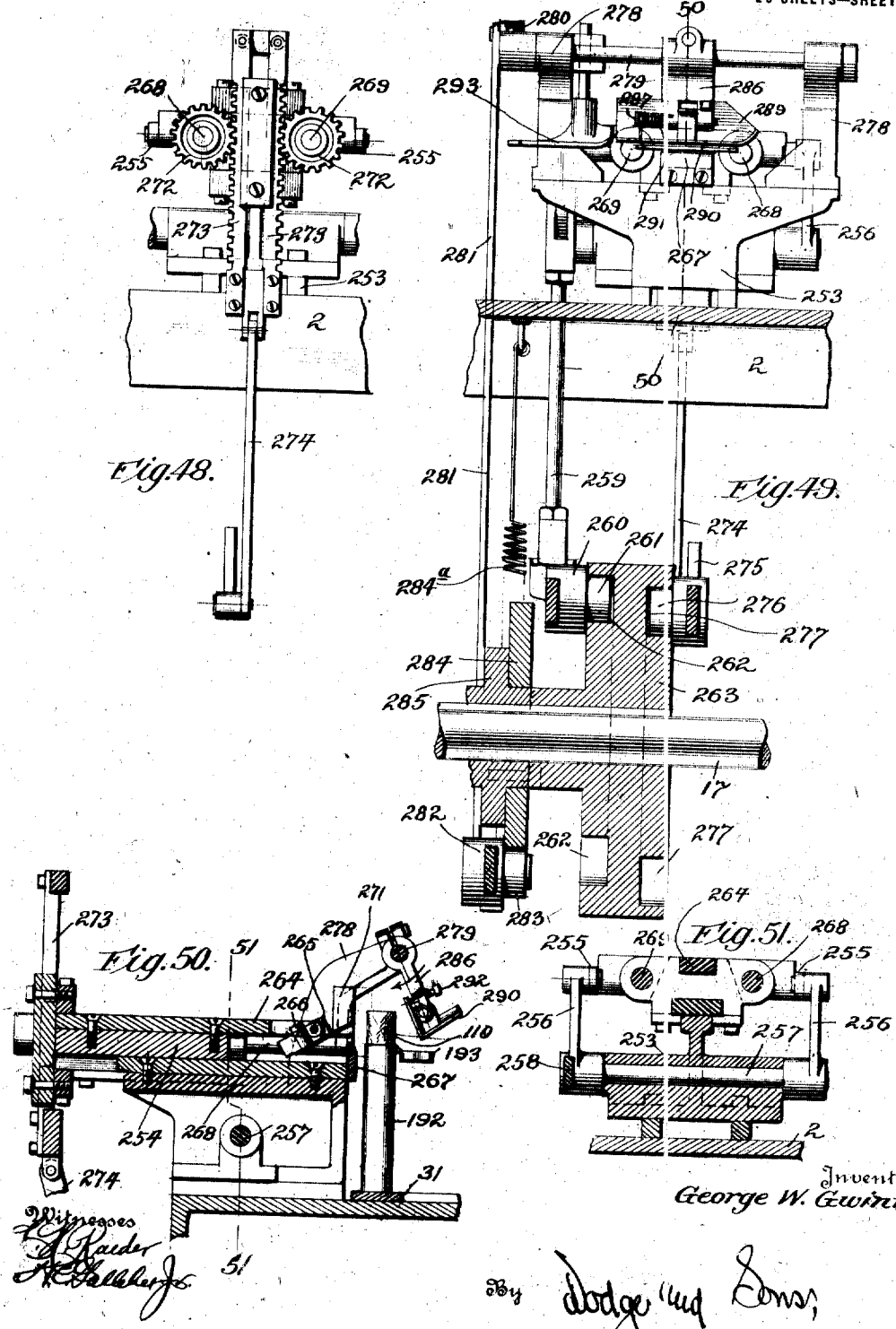

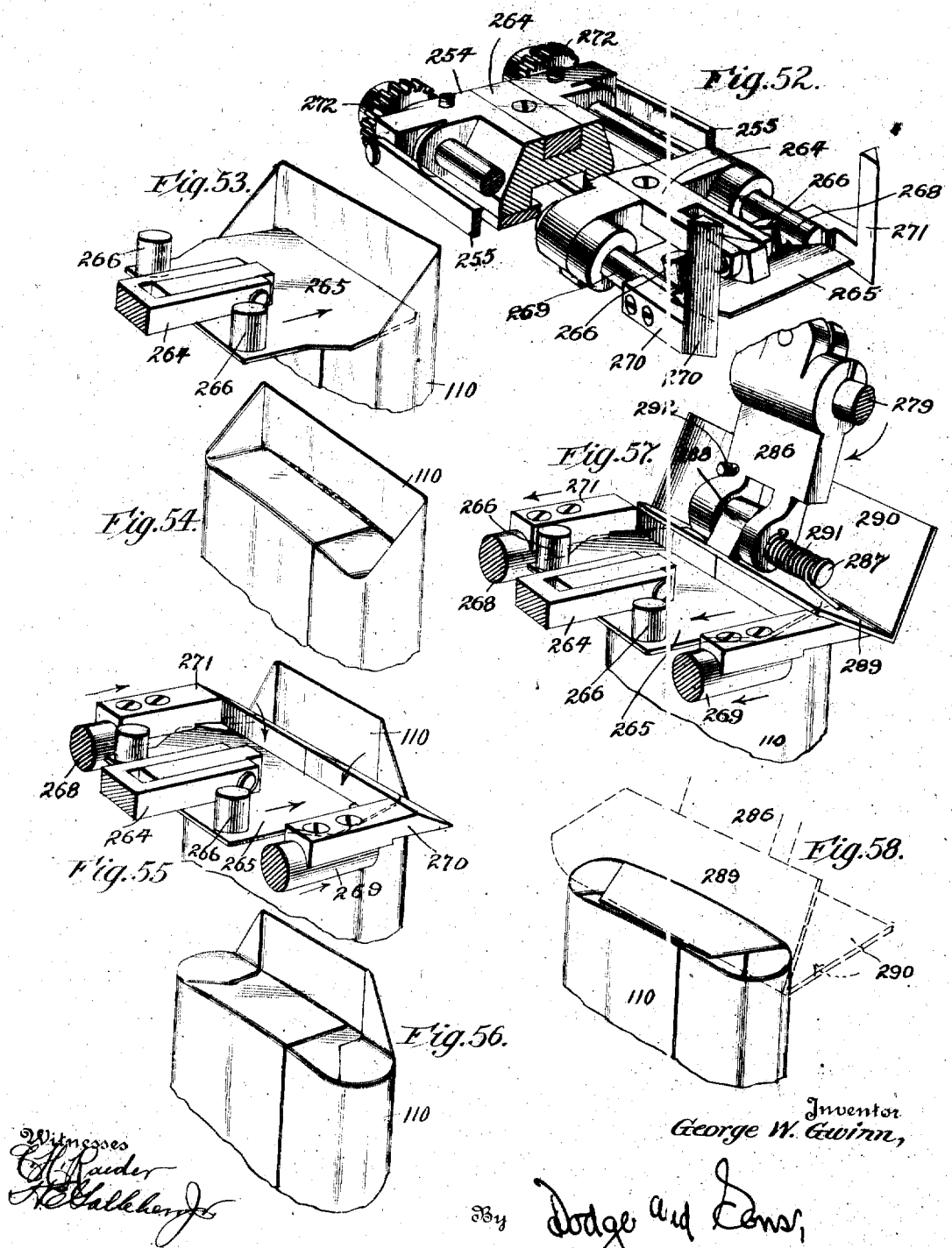

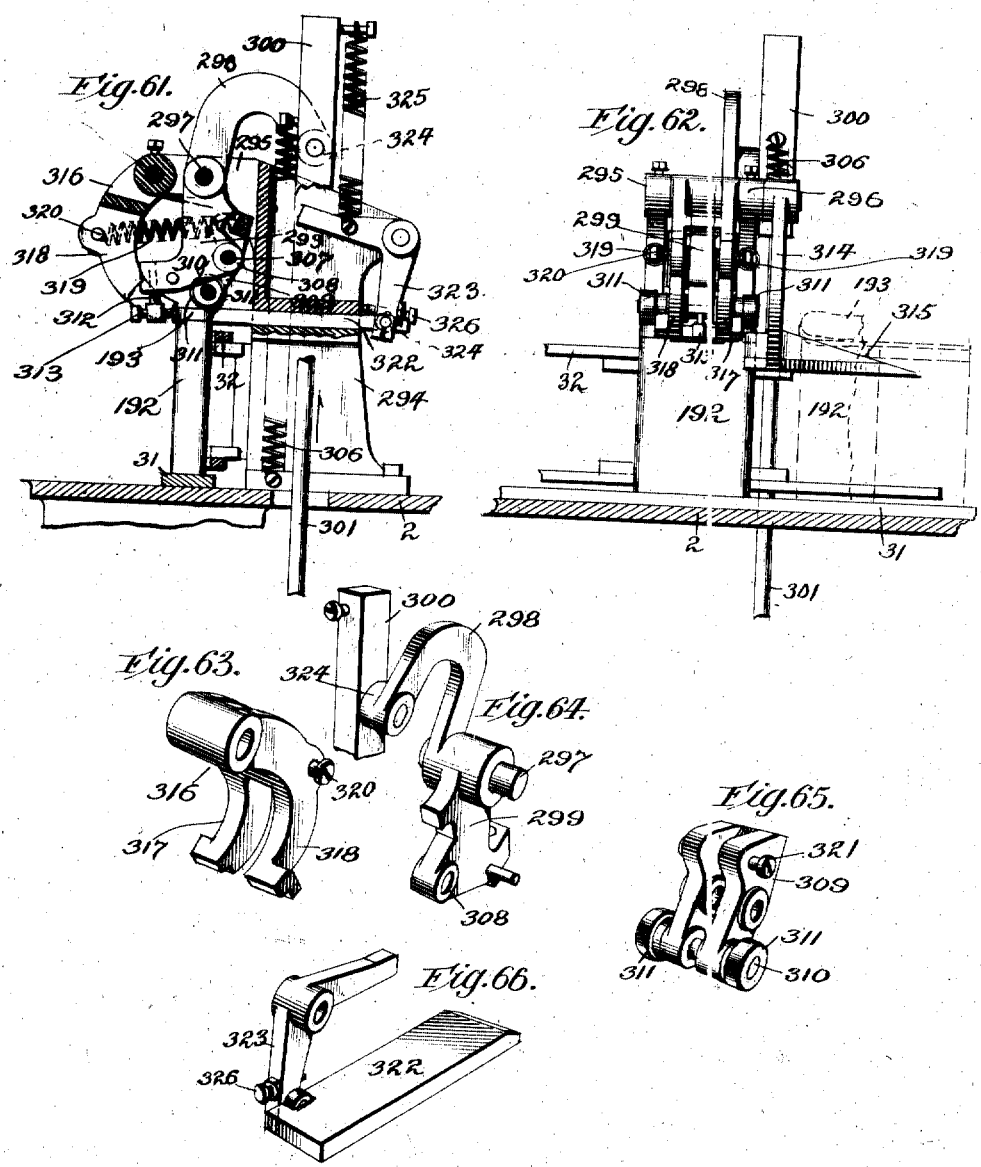

UNITED STATES PATENT OFFICE.

GEORGE W. GWINN, OF NEW YORK, N. Y., ASSIGNOR TO AUTOMATIC PACKING & LABELING COMPANY, OF DURHAM, NORTH CAROLINA, A CORPORATION OF NORTH CAROLINA.

MACHINE FOR PACKING MATERIALS.

1,221,313.  Specification of Letters Patent.  Patented Apr. 3, 1917.

Application filed December 29, 1914. Serial No. 879,565.

*To all whom it may concern:*

Be it known that I, GEORGE W. GWINN, a citizen of the United States, residing at New York, in the county of New York and State of New York, have invented certain new and useful Improvements in Machines for Packing Materials, of which the following is a specification.

My present invention pertains to an improved machine for packing materials, and more particularly to a machine for placing a given weight or charge of material, as for instance, tobacco, in a wrapper or liner and inclosing the same in a receptacle, such as a tin can having a hinged cover or top.

One embodiment of the generic invention is disclosed in the annexed drawings, it being understood that the mechanism may be varied in arrangement and detail as will be evident to one skilled in the art.

In the drawings:

Figure 1 is a side elevation of the machine, the upper portion being broken away in part and the weighing mechanism, which is employed in conjunction with the machine, being omitted, as it is from the other views also;

Fig. 2 a vertical sectional view, on the line 2—2 of Fig. 4;

Fig. 3 a similar view, taken at right angles to Fig. 2, on the line 3—3 of Fig. 4;

Fig. 4 a horizontal sectional view, on the line 4—4 of Fig. 3;

Fig. 5 a like view on the line 5—5 of Fig. 3;

Fig. 6 a horizontal sectional view on the line 6—6 of Fig. 3, showing the driving mechanism for the two turrets, certain underlying members being omitted;

Fig. 7 a vertical sectional elevation, on the line 7—7, of Fig. 2, of part of the liner-forming mechanism;

Figs. 8 and 9 detail views of the cams and levers, taken respectively on the lines 8—8 and 9—9 of Fig. 7;

Fig. 10 a cross-section of the paper-cutting roll and platen roll employed to sever the requisite length of paper to form a liner;

Fig. 11 a plan view of the cutting or knife-carrying roll;

Fig. 12 a sectional elevation of the liner-forming mechanism;

Fig. 13 a side elevation thereof, the parts being in that position in which a liner-sheet has just been wrapped about one of the tubular forms;

Fig. 14 a horizontal sectional view on the line 14—14 of Fig. 12, the parts, however, being differently positioned;

Fig. 15 a like view, on the line 15—15 of Fig. 13, the parts corresponding in position to those disclosed in said figure;

Fig. 16 a similar view, the initial forming movement of the liner about the form being disclosed;

Fig. 17 a front elevation of the same parts;

Fig. 18 a sectional elevation of the tubular form, the finger for holding the overlapped edges of the liner-sheet, and its allied parts;

Fig. 19 a rear elevation, partly in section, of said parts, the cleaning plunger for the form being shown therein and moving upwardly;

Fig. 20 a perspective view, partly broken away, of the liner-wrapping devices;

Fig. 21 a perspective view of the liner-clamping finger and its supporting frame;

Fig. 22 an elevation of a portion of the tucking mechaism employed to tuck the lower end of the liner into the tubular form;

Fig. 23 a vertical sectional view, on the line 23—23, of Fig. 22;

Fig. 24, a perspective view of the tucker fingers;

Figs. 25 to 28 inclusive sectional views illustrative of the action of the tucking mechanism;

Fig. 29 a detail view of the cam and lever employed to raise and lower the form-carrying turret and to likewise raise and lower the liner-wrapping mechanism in unison therewith;

Fig. 30 a vertical sectional view, taken on the same section as Fig. 3, but on an enlarged scale, of the form-carrying turret, showing a liner and contained charge being forced down into a can;

Fig. 31 a horizontal sectional view, on the line 31—31 of Fig. 30;

Fig. 32 a similar view on the line 32—32 Fig. 30;

Fig. 33 a side elevation of the combined charge-discharging and liner-removing plunger and its operating cam;

Fig. 34 a detail view of the plunger employed to impart a final compression to the charge of material prior to the folding of the upper end of the liner thereover;

Fig. 35 a like view of the can-removing mechanism;

Fig. 36 an elevation of the "coupon" feeding and depositing mechanism adapted to place a coupon within the rearwardly or outwardly turned lid, prior to its being turned over and closed upon the can body;

Fig. 37 a top plan view thereof;

Fig. 38 a vertical sectional view, on the line 38—38 of Fig. 37;

Fig. 39 a transverse sectional view, on the line 39—39, of Fig. 38, showing the cutting mechanism for the coupon slip;

Fig. 40 a like view on the line 40—40 of Fig. 36, illustrative of the driving mechanism;

Fig. 41 a like view on the line 41—41, Fig. 36, showing the strip feed;

Fig. 42 a perspective view of the hold-down, the knife, and the deflector or depositor for the severed coupon;

Fig. 43 a similar view of one of the guiding members for the coupon strip;

Fig. 44 a like view of a section of such strip;

Fig. 45 a perspective view of the coupon deflector;

Fig. 46 a top plan view of the folding mechanism for the upper end of the liner;

Fig. 47 a transverse sectional elevation thereof;

Fig. 48 a rear elevation of the actuating mechanism for the end folders;

Fig. 49 an elevation of the folding mechanism;

Fig. 50 a transverse vertical section, on the line 50—50 of Fig. 49;

Fig. 51 a similar view on the line 51—51 of Fig. 50;

Fig. 52 a perspective view of the initial side folder, and end folders;

Fig. 53 a like view, showing the operation of the initial folder;

Fig. 54 a perspective view of the package after the action of said folder;

Fig. 55 a perspective view of the initial folder and the side folders;

Fig. 56 a like view of the upper end of the package, after such folders have acted;

Fig. 57 a view showing the said folders in the act of withdrawal, with the final folder ready to move inwardly;

Fig. 58 a perspective view of the completely folded top, with the final folder shown in dotted lines;

Fig. 59 a top plan view of the lid-closer;

Fig. 60 a side elevation thereof;

Fig. 61 a sectional elevation, showing the parts in that position which they assume after having closed the lid upon the can body;

Fig. 62 an elevation thereof;

Figs. 63 to 66 inclusive perspective views of certain parts of the lid-closing mechanism; and Fig. 67 a detail view of the plunger-wiper.

The main object of my invention is to produce a machine which will automatically and with a minimum of attendant manual service pack a charge of material in a can, with a wrapper about the material, and thereafter close the can-lid.

A further object of the invention is to provide a mechanism whereby a coupon (or similar device) may be placed in the outwardly-turned lid prior to the same being turned over and closed on the can body.

With these and other objects in view, the machine may be said to comprise a liner or wrapper feed mechanism, embodying a cutter adapted to sever a sheet of the requisite length; a mechanism adapted to wrap the liner sheet about a hollow form; means for tucking (or folding) the lower end of the sheet into the lower end of the form, then manually slipping a can upwardly over the liner; thereafter forcing a weighed charge of material into and through the form and into the liner, thereby stripping the liner and the can from the form; depositing a coupon in the open lid; folding the upper end of the liner; and finally closing the lid.

Referring first to Figs. 1 and 6 inclusive, 1 denotes the main frame, surmounted by a top or platform 2, from which latter extends a vertical column 3, shown as broken away and designed to support any suitable weighing mechanism adapted to discharge a given quantity of material at predetermined intervals into a funnel or hopper. The weighing mechanism is not shown.

The top and frame are designed to support the driving devices for the various mechanisms, and located above the table are two turrets (hereinafter set forth in detail) which partly overlap, one being the form-carrying turret, which also carries the charge compressing mechanism, and the other the can receiving and moving turret, which carries the filled cans successively past the coupon feeding and placing device, past the final charge compressing plunger, past the final liner, wrapper or bag-folding mechanism, then to the lid-closing mechanism, and, finally, to the can-removing device.

The main driving shaft 4 receives its motion from a constantly driven pulley or wheel 5, through an interposed clutch 6, which clutch is controlled by the operation of a swinging pedal 7, Figs. 1, 4 and 5 (the same being broken away in the latter figures to avoid confusion), located at the front of the machine where the operator has his position. The pedal is connected to the sliding clutch member through draw-rods 130

8 and 9, interposed bell-crank 10, and a rocker yoke 11.

Shaft 4 carries a pinion 12, which meshes with gear 13 secured to a countershaft 14, a bevel pinion 15 being likewise secured to said shaft. Pinion 15 meshes with a similar pinion 16 secured to one end of a third shaft 17, extending at right angles to shaft 14, shaft 17 finding its support in a bracket 18, see more particularly Fig. 6, secured at its ends to projections 19, extending down from the top 2 (see also Figs. 47 and 60).

Shaft 17 has secured to it a second bevel pinion 20, which meshes with a like pinion 21 secured to a shaft 22 supported in bracket 18, an arm or lever 23 being secured to the upper end of said shaft and carrying a roller 24 adapted to coact with the radially-disposed slots 25 formed in the under face of a plate 26, see Figs. 3 and 6. Said slotted plate, with the lever, form a Geneva movement adapted to impart a step-by-step motion to allied parts. Plate 26 is secured to a vertically-disposed shaft 27, said shaft finding its support in a bracket 18' and bearing member 28, and in turn having secured to its upper end above the top 2, the can receiving and transporting turret 29, the outer face or edge whereof is provided with a series of can receiving pockets 30, Fig. 4. Said pockets are removable, so that the turret may be equipped with any size or shape required, and are open at the outer side. A circular track 31 underlies the turret and upon which the bottom of the can rides, and a guide or guard rail 32 (see Fig. 4) carried by suitable supports extends around the turret from the point where the cans are positioned therein to the point of discharge.

Secured to the upper face of the plate 26 is a relatively large gear 33, Figs. 3 and 6, said gear meshing with a smaller gear 34, loosely mounted on a vertical shaft 35, supported in a bracket 36, said gear in turn meshing with a pinion 37 the hub whereof is splined to a long sleeve 38 which finds its bearing at its lower end in a bracket 39. At its upper end the sleeve is formed with a collar 40 which overlies the upper end of a supporting bearing 41 secured to top 2, Fig. 3. A second sleeve or quill 42 is mounted in sleeve 38 and is secured thereto by set-screws 43, said quill having a squared opening extending vertically therethrough and receiving a shaft 44 having a similar cross-section, whereby as the sleeve and quill are rotated through the gearing and connections above described the shaft will likewise be rotated.

The lower reduced end of the shaft has a stepped bearing in a post or member 45, see Figs. 3 and 29, pivotally connected at its lower end to a link 46, which in turn is likewise connected to a lever 47, journaled on a shaft 48 secured in the frame of the machine below the power shaft 4. A cam 49, mounted on shaft 14, serves to periodically raise and lower said lever and consequently to raise and lower shaft or column 44. A bracket 50 is rigidly secured to lever 47, extending upwardly and to one side thereof, see Fig. 5, and a lever 51 is pivotally connected to the upper end of the bracket; a similar lever 52 being pivoted to a fixed bracket 53, Fig. 2, and the levers in turn being pivotally connected. A heavy coiled spring 54 is connected at one end to the point of connection between said levers, the opposite end of the spring being adjustably connected through a draw rod 55, Figs. 4 and 5, to a sleeve 56, mounted on shaft 48. This mechanism acts as a counterbalance and serves to assist the cam in raising the shaft (and the weight carried thereby, to wit, the form-carrying and material-compressing turret which will shortly be described) and likewise prevents undue jar or strain when the shaft is being lowered, for at such time the levers 51 and 52 will be brought more nearly together, their adjacent pivotally connected ends thrown forwardly and spring 54 placed under stress. Upon an upward movement of shaft 44 the spring tends to straighten the levers and consequently assists in the upward movement of the main actuating lever 47.

The upper end of shaft 44 is rounded, see Figs. 2, 3, 30, 31 and 32, and the form-carrying turret or member is secured thereto. It may be said to comprise a plate 57 having a split hub 58 by which it is clamped to the shaft, the plate under the present construction being provided with four pockets 59 adapted to have clamped thereto the charge receiving and compressing mechanism and the depending hollow form about which the liner is wrapped and through which the charge is introduced. But one of such devices is shown in Figs. 30 and 32, and may be said to comprise a body portion having three upright walls 60, 61 and 62, and open on its inner side toward the shaft, with ears 63 extending laterally from the sides and by which the structure is removably secured to the turret. The bottom wall 64 stops short of the outer wall 62, forming an opening through which the material may be discharged into the so-called form which consists of an elongated tube 65 of a cross-section the same as that of the can 192 into which the material is to be packed, the tube however being slightly smaller than the interior dimensions of the can so that it may pass, with the liner or wrapper thereon, into the can. The hinged lid of the can is denoted by 193. A movable side or compressor plate 68 is mounted between the side walls 60, 62 and a sliding bar 69 is secured thereto, the bar working in a guideway formed in the under side of plate 57 and carrying a roller 70 working in a cam groove 71 formed in the cam plate 72. A second cam plate 73 is located below plate 72 and is provided with a cam groove 74, in which work the rollers 75 of the cut-off slides or bottom plates 76 provided for each of the charge-receiving chambers. Plates 72 and 73 are secured to each other and while movable up and down with shaft 44 do not rotate therewith, being prevented from so doing by a rod 77 which is secured to the bearings 41 and extends upwardly through and slides in a lug 78, Figs. 1, 2 and 31, formed upon plate 73. The member 57 is provided with notches 79, Fig. 32, which when the turret is lowered and at rest, receive the upper end of said rod and serve to steady and properly position the same.

The cams are so formed and related that the slides are closed and the compressor plate withdrawn when the measured charge is being fed through a funnel 80, Figs. 1 and 2, which underlies the discharge of the weighing mechanism. The charge is thereafter compressed by the inward movement of plate 68, slide 76 withdrawn and the compressed charge forced downwardly, the turret meanwhile being moved from beneath the hopper and advanced a quarter revolution. By the use of the slide 76 the material is prevented from passing out of the charge-receiving and compressing chamber, until the charge is fully and evenly compressed. Were it otherwise, a portion of the charge would pass down into the tube 65 and the remaining portion alone would be compressed, producing an uneven package.

The means whereby the charge and the liner or wrapper are placed in the can will presently appear. Hopper or funnel 80 is carried by a bracket 81 mounted on the upper end of shaft 44 and held in position with reference thereto by a cap piece 82, said bracket being held from turning with the shaft by a block working in a slideway 83 secured to column 3, Figs. 1 and 2. Thus the bracket and hopper move up and down with the turret but do not rotate therewith.

*Liner or wrapper mechanism.*

This mechanism will be best understood upon reference to Figs. 1, 2, 3, 4, 5 and 7 to 20 inclusive. Secured to and extending outwardly from frame 1 is a bracket 84 upon which is carried a roll of paper, 85, preferably paraffined or waxed, the web passing upwardly over a drum 86, supported by arms 87 extending outwardly from a frame 88 (see Fig. 7) which frame in turn is supported by a column 89 and a post 90. Mounted in frame 88 is a pair of paper feed rollers 91, 92, and immediately below the same is a knife carrying roller 93 and a roller 94 coöperating with the knife. The knife (Figs. 10, 11 and 12) is denoted by 95 and is secured in place by a filler strip 96 which also secures a rubber strip 97 provided with outwardly-projecting fingers 98 adapted as the roller is turned to impinge against the paper and hold it in close contact with roller 94 while the knife is acting, and also to throw the severed liner downwardly after the knife has cut the same from the strip. The filler is cut away as at 99, to receive the fingers as the knife comes into action. Motion is imparted to the feed and knife rolls through gears 100, shown in Fig. 1, secured to the ends of the roll shafts, and an idler, 101, the shaft of roll 94 having secured to its opposite end a sprocket wheel 102, about which passes a chain 103. Said chain also passes about a sprocket wheel 104, Figs. 4, 5 and 7, secured to shaft 105 mounted in bearings carried by bracket 84, said shaft also carrying a sprocket 106. A second sprocket chain 107 passes about sprocket 106 and around a sprocket 108 mounted on shaft 14. The feed and knife rolls are thus driven in timed relation to the other parts, all of which derive their movement from the common power shaft 4. Located directly below the knife roll is an inclined chute 109, Figs. 2, 10, 12 and 13, adapted to receive a wrapper or liner 110 as it is severed from the web 85 and to deliver it to a holder (later described) adapted to bring it into juxtaposition with one of the form tubes 65.

Secured to the column 89, Fig. 7, is a bracket supporting member 111 carrying guides 112, 113, in which is mounted a sliding bar or member 114, having a bracket 115 secured to its lower end, which in turn is secured to an arm or lever 116. Said arm at its opposite end is secured to the through-pin which connects the post or block 45 to link 46, see Figs. 2, 3, 5 and 29. As will be appreciated, slide 114 will, through these connections, move up and down in unison with shaft 44 and the turret carried thereby.

Secured to said slide and extending inwardly toward the form-carrying turret is a bracket 117 upon which is mounted and movable therewith the liner or wrapper wrapping mechanism. Secured to the under portion of said bracket is a two-armed supporting member or frame 118, see Figs. 12, 13, 14, 15, 16 and 17, to the outer end of each arm of which there is secured a vertically-disposed U-shaped channel member 119, each open at the top and spaced apart from each other a distance equal to the width of the liner sheet 110. Adjustably secured to and extending across from one member 119 to the other, is a bar 120 provided with two relatively thin cross blocks 121 and upon which the liner is adapted to come to rest as it is discharged from chute 109 into the channel members 119. Said channels, bar 120, and the blocks may be termed a temporary supporting frame for the liner sheet, which serves to hold the liner in proper position with reference to a form member 65, so that it may be wrapped or enfolded around the lower end of the tube, with the lower end of the liner projecting below said tube, see more particularly Fig. 17. The liner in width is in excess of the circumference of the form so that when it is wrapped around the same its edges will overlap, see Figs. 14, 15 and 19, and to wrap the same about the form the following mechanism is employed.

A pair of squared shafts 122, 123, see Fig. 7, having bearings at their upper ends in a block 124, secured to frame 88, and passing through a bearing block 125, secured to top 2, at their lower ends, are adapted to have an oscillating movement imparted thereto. Shaft 122 has a crank 126 secured to its lower end, the crank being connected by a pitman 127 to a lever 128, Figs. 5, 7, 8 and 9, fulcrumed upon a shaft or rod 129, carried by the bracket 84. A similar crank 130 is secured to shaft 123 and a pitman 131 connects said crank with a lever 132. Cams 133 and 134 secured to shaft 105 serve to rock said levers 128 and 132 and through the connections just described to oscillate shafts 122 and 123.

A bifurcated block 135, Fig. 20, having squared openings or bearings in its arms, is mounted on shaft 122 and a similar block 136 is mounted on shaft 123, the arms straddling bracket 117 so that said blocks will move with said bracket and up and down on said shafts while still partaking of the oscillating movement of the shafts. Block 135 has secured to it a vertically-disposed folding plate 137, slightly incurved at its forward edge, while block 136 carries a similar plate 138. A pair of tapes 139, 140 are connected to the outer faces of the plates, extend across one above the other, from plate to plate, and lie back of the liner 110 and the form 65, see Fig. 15, when the folder plates are retracted or thrown rearwardly.

Mounted upon the upper face of bracket 117 is a sliding plunger 141, urged forwardly by a spring 142, said plunger carrying a head 142a. A lever 143 fulcrumed at 144 upon bracket 117, has its outer end notched and engages a pin 145 on the plunger. A roller 146 arranged at one side of said lever lies in the path of block 135, or a bearing plate 147 (Fig. 20) secured thereto and so long as block 135 is thrown rearwardly the plunger is held in its retracted position with the spring 142 under stress. As the block 135 and its folder swing forwardly, and such movement takes place in advance of the movement of block 136 and its folder plate, lever 143 is released, permitting plunger 141 to move forward, its head 142a coming in contact with the rear face or side of liner or wrapper 110 and carrying it forward into direct contact with the form 65. As this takes place plate 137 carries the liner around into contact with the form, Figs. 16 and 17, and the tapes 139, 140 begin to draw about the outer face of the liner. Block 136 and its plate 138 then swing forwardly, carrying the opposite edge of the liner to place, the edges overlapping, as indicated. As the folders come to folding or wrapping position, the tapes hug the liner closely, causing it to conform closely to the form, free of all wrinkles or buckling. With some forms it is not absolutely essential that the tapes be employed, and in such case the folders alone may be relied upon to properly position the liner.

In Fig. 14 I have shown a liner completely wrapped about the form, and also in Fig. 15. In this latter figure it will be seen that another liner has been dropped into the temporary holding frame or device in rear of the tapes and folders and that the plunger is retracted. The form with the wrapper thereon as shown in Fig. 15, is supposed to be moving or just about to move away from the folding devices to a point over the tucking or lower end folding mechanism for the liner to presently be described.

It is, of course, essential that the liner be held in its wrapped position on the form after it is placed thereon and to that end I employ a finger 148 of the form best shown in Figs. 12, 13, 18 and 21. The extreme lower end 149 of said finger is inclined outwardly from the adjacent bearing portion 150 and the upper end is secured to a bail-shaped frame comprising a back bar 151 and side arms 152, 153, pivotally supported upon a rod 154, which finds its bearings in brackets 155, secured to the lower portion of the side walls 60 and 62 of the charge receiving chamber.

A coiled spring 156, carried by rod 154, has one end bearing on the frame bar 151, while the other end bears against the bottom of the receiving chamber, said spring thereby acting to normally throw the lower end of the arm inwardly into contact with the form or the wrapper or liner thereon.

The outer end of arm 152 of the finger-carrying frame is cut away upon its upper face and is adapted to coact with the lower end of latch 157 pivotally supported in a notch 158, Fig. 32, formed in one of the ears or lugs 63 of the charge receiving chamber, the lower end of the latch being drawn over arm 152 by a coiled spring 159. The upper end of the latch extends inwardly and underlies a release rod 160, secured to and extending downwardly from a cross head or arm 161, see Figs. 2, 3, 12, 18, 19 and 30, which head is rigidly secured to the upper end of a vertically-disposed endwise reciprocating bar or rod 162 which passes through bearings 163, formed as a part of the column 89, see Figs. 4 and 7. Said rod extends beneath top 2 and is connected at its lower end by a link 164 to an actuating lever 165, fulcrumed on shaft 48 and actuated by cam 166, see Figs. 5 and 33, secured to shaft 14. The cross-head also carries a second downwardly extending rod 167 which stands in vertical alinement with the outer end of arm 153. In operation after the liner has been wrapped about the form in the manner above set forth, and just prior to the withdrawal or retreat of the wrapping devices, rod or bar 162 descends, rod 160 contacting with the upper end of latch 157, and throwing its lower end outwardly from over the arm 152 of finger carrying frame thereby permitting the frame to rock under action of spring 156 and the finger to move quickly in toward the overlapped edges of the liner or wrapper. Its inward movement, however, is arrested by arm 153 coming into contact with the lower end of rod 167, Figs. 18, 19 and 21, at which time crosshead 161 and bar 162 are at their limit of downward movement. The movement is then reversed and as soon as the rod 167 moves up, spring 156 carries the finger 148 inwardly, so that its face 150 comes gently into contact with the liner, firmly holding it against the form. This position of the finger is maintained until the liner, the charge of material and applied can (which is placed in position, as will presently appear) are forced or carried down in the can receiving and carrying turret, or pass from the positions shown in Figs. 1 and 2 to the positions shown in Fig. 3, in which latter view a can with the liner and charge are shown as being lowered and the form 65 about to be withdrawn from the can. To effect a release of the finger 148 at such time I provide a post 151ª, which extends up from top 2 and is of such height as to contact with the member 151 of the finger carrying frame and rock it upwardly, withdrawing the finger and permitting latch 157 to swing inwardly over arm 152 and again lock the frame with the finger in its vertical movement. Crosshead 161 also carries two hollow rods 169, 170, Figs. 3 and 19, carrying at its lower end a swabbing plunger 171, which as the head is moved down and up is caused to pass downwardly and upwardly in the material receiving chamber and the underlying form 65, cleaning it of any adhering material and likewise lubricating it with a suitable mixture, such as glycerin thinned with rum or alcohol, fed through the hollow rods from attached cups 172 carried at their upper ends.

Tucker mechanism.

When a liner or wrapper has been placed on a form and clamped thereto by the finger, the turret is given a quarter turn and this brings such form and liner to position over the tucker mechanism at the front of the machine at the attendant's stand. The mechanism will be best understood upon reference to Figs. 1, 3 and 22 to 28 inclusive.

Secured to one of the horizontally-disposed members of frame 1 is a slide-way 173, in which is slidably mounted a vertically-disposed bar or slide 174, the slide being held normally in an elevated position by a spring 175 and limited in its upward movement by a stop pin 176. Secured to the upper end of the slide is a bifurcated bracket 177, in which is journaled a shaft 178, having secured to it between the arms of the bracket a block 179 carrying a tucker finger 180. A second shaft 181 is also mounted in bracket 177, said shaft having splined thereto a block 182 carrying a second tucker finger 183. Intermeshing gears 184 and 185 are secured respectively to shafts 178 and 181, and a spring 184ª connected to blocks 179 and 182 and tending to draw the same together prevents backlash in the gears. Shaft 178 has secured to it a lever 185ª which through link 186 is connected to a lever 187 fulcrumed on a bracket 188, secured to top 2, the rear end of said lever carrying a roll 189, adapted to coact with a cam plate 190, secured to cam 49. A spring 191 serves to hold the outer end of lever 187 elevated and lever 185ª likewise, whereby the upper ends of fingers 180, 183 are held apart.

In operation, when the form turret has descended to the point illustrated in Fig. 25, the cam 190 is so timed as to actuate lever 187 and through link 186, lever 185ª, shaft 178 and gears 184 and 185, to throw the upper end of arms 180 and 183 inwardly, thereby pinching the opposite sides of the liner 110 inwardly, the form meantime continuing to descend. The parts take the successive positions shown in Figs. 25 to 28 inclusive during such descent and, as will be seen, the lower end of the liner is tucked in about the lower end of the form, the lower edges of the liner being folded or plaited upon themselves, and such plaited portions being carried up within the tube. The fingers grasp the liner upon the opposed longer sides or faces thereof, it being understood that the form, in the present instance, is oblong and materially longer than it is wide, and, by making the upper ends of the fingers rounded at the corners, the liner is carried into folded or plaited position without being torn and the closure made is a relatively close or tight one. Upon a reverse or upward movement of the turret, Fig. 28, carrying with it the form, the plaits or tucked portions readily slip off the fingers which are then thrown apart ready to act upon the next liner presented.

It is at this point, as the turret reaches or nears the limit of its upward movement that the operator or attendant slips a can, designated by 192, upwardly over the liner and the form, the can lid 193 being thrown back and projecting outwardly toward the attendant. In its upward movement the edge of the can slips beneath the outturned end 149 of the retaining finger by which it is now held, the liner, of course, being within the can, with the exception of that portion which still projects above the can.

The tucking mechanism is mounted upon a slide for the purpose of preventing damage thereto, and to the form 65, should the attendant inadvertently place a can upon the form (and applied liner) as the same descends, instead of waiting for its upward movement. Through the Geneva movement heretofore set forth, the turret is given a quarter turn after it is raised, with the can in place on the form, which movement brings the form with the liner and can thereon beneath the hopper (Fig. 2) at which point the charge chamber is filled. Upon the next quarter revolution the liner and can are carried over a pocket 30 in the can receiving turret and in case the can should not be fully shoved up there is provided an upwardly inclined plate 195, Figs. 1, 2 and 4, which underlies the path of movement of the form turret at this point and which, contacting with the bottom of any can which may not be fully positioned, will shove the same upwardly. During this stage of movement of the turret the charge of material will be compressed and the can and liner and the compressed charge will be brought into position where they may be carried down into the underlying pocket 30 of the can receiving turret. It is at this point that the compressed charge of material is forced downwardly into and through the form, coming into contact with the tucked end of the liner and stripping the liner and can from the form and depositing the can with the liner and charge therein into the underlying pocket 30.

To effect this there is provided a plunger 196, Figs. 3, 30 and 33, of a size to make a neat fit with the interior of the form tube 65, said plunger being mounted on the lower end of a rod 197, extending downwardly from an arm 198 secured to shaft 162. Cam 166 which actuates rod 162 and the cam 49 which raises and lowers the form turret are so relatively timed that they both move down together, and as the can comes into contact with track 31 the turret comes to rest, the plunger continuing its downward movement, forcing the charge from the charge-compression chamber through the tubular form 65 and fully into the liner. The plunger then has a slight period of rest and the turret is elevated, withdrawing the form from its position between the liner and charge, Fig. 30, after which the plunger ascends and is carried clear of the top of the charge receiving and compressing chamber, so that the turret may be again advanced to repeat its cycle of operations.

Thus, a can with the exact charge, protected by an interposed liner, is positioned in the can-receiving and traversing turret with the upper end of the liner protruding above the can and the lid open. The can turret is given an eighth revolution at each movement and upon the second movement it is brought into position where a coupon or insert of any character is placed in the open lid.

*Coupon or insert mechanism.*

This mechanism is best shown in Figs. 4 and 37 to 45, both inclusive, and is designed to cut a coupon or the like from a strip and place it in the lid of the can, which at such time is turned outwardly into the horizontal. It is found desirable to place it in such position rather than within or upon the wrapper or liner, or within the can body, this for the reason that it is at once prominent when the can is opened, and for the further reason that when merely laid upon the top of the folded upper end of the wrapper it is apt to become displaced before the lid is closed. Again, when placed within the open end of the wrapper before the same is folded down it interferes at times with the proper folding of said open end.

Secured to the top 2 is a base piece 199 to which is hinged upon pins 200 a bracket 201 in which is mounted a shaft 202. The shaft at one end has affixed to it a ratchet 203, and loosely mounted thereon is a sprocket wheel 204, about which and over a tightener wheel 205 passes a sprocket chain 206, said chain deriving its motion from a sprocket wheel 207 mounted on shaft 14, see Fig. 5. A pawl 208, pivoted to the face of sprocket 204 coöperates with ratchet 203, being held in relation thereto by a spring 209. A cam 210 is secured to sprocket 204 and coacts with a roller 211 carried upon one end of a bell-crank lever 212, fulcrumed upon a stud 213 extending out from bracket 201. The other end of the lever is provided with an outwardly and upwardly inclined arm 214 provided with a cam face 215. A spring 216 tends to draw the bell-crank inwardly and to hold the roller against the cam. The arm swings in and out over the path of movement of the can, see Fig. 37, and should a can lid be upstanding, as in dotted lines in the lower portion of said figure, the arm will come into contact therewith and by reason of the cam face 215 and the swinging of the arm will turn the lid outwardly into the horizontal in position to receive the coupon.

Secured to bracket 201 is a vertically disposed post or standard 217, which forms the support for the roll of coupon strip designated by 218. Said strip is provided with a series of centrally-disposed perforations 219, and the distance between each hole is equal to two coupons. The strip passes downwardly beneath a bar 220, thence around a toothed drum 221, and under guide plates 222, overlying the same. Said drum is secured to a shaft 223 mounted in a bifurcated extension of bracket 201, said shaft also having secured thereto a ratchet 224, and likewise providing a support for a rocker 225, carrying a pawl 226. A pitman 227 is connected to the rocker and to a crank pin 228, extending outwardly from a cap piece 229, secured to shaft 202, see Fig. 40. Through these connections a step-by-step motion is imparted to the drum 221, which is kept from overfeeding by brake shoes 230 mounted on spring arms 231. The strip passes from the roll beneath a guide plate 232 and over the lower knife bar 233. The coacting blade 234 is secured to the lower end of a slide 235 which likewise carries a spring-pressed hold-down 236 for the strip, acting to hold the same when the knife is acting, said slide also having secured to it a downwardly-inclined deflector plate or guide 237, adapted to deflect or throw the severed coupon into the underlying outwardly-turned lid. To raise and lower the slide I provide a lever 238, fulcrumed at 239 and pin-jointed at its forward end to a block 239ª attached to the upper end of the slide. A cam 240, secured to shaft 202, is employed to actuate the lever.

A handle 241 is secured to the hinged bracket 201, whereby the structure as a whole may be lifted if need be or thrown entirely back.

*Recompressing of charge.*

After a coupon is thus placed the turret is advanced a step and the can with the top of the liner still standing upright comes under a charge-compressing plunger which serves to recompress the charge in the can prior to the liner top being folded. Certain materials have a tendency to expand and it is essential to a neat folding of the liner top that the material or charge should not be in the way. The plunger and actuating mechanism for accomplishing this are shown in Figs. 4, 5, 6 and 34. Extending upwardly from bed or top 2 is a fixed guide post 242, in which is mounted a slide 243, the slide carrying a laterally extending bracket 244 to which is secured the plunger 245. The slide is actuated through a link 246 secured to a lever 247 fulcrumed upon a rod 248 held in brackets 249 secured in turn to frame 18, see Fig. 5. A cam 250 secured to shaft 17 coacts with a roller 251 and serves to elevate the slide, while a spring 252 draws it down. The cam is so timed that the plunger is moved down and up while the can is at rest beneath the same.

*Liner-folding mechanism.*

This mechanism is best shown in Figs. 1, 3, 4 and 46 to 58, both inclusive. After the material has been recompressed by the plunger 245, as just set forth, the can turret is given a further eighth revolution and the can, with the liner projecting above the same, is brought into working relation with the liner-folding mechanism. In Figs. 46 to 58 inclusive (which are detail views of the folding mechanism and illustrate the manner in which the folds are made) the can is omitted for the sake of clearness. The folding means may be said to comprise a plate adapted to infold one side of the upstanding liner, preferably that side where the sheet is overlapped, two end folders and a second side folder. Secured to the top 2 is a stand or supporting member 253, upon which is mounted a sliding carriage 254, which is traversed to and from the can and the upwardly projecting liner by links 255, and arms or levers 256 secured to a shaft 257 journaled in the support 253. To one end of the shaft 257 is secured a second arm or lever, 258, said arm in turn being connected to the upper end of a draw-bar or rod 259, said bar being connected at its lower end to a lever 260 which carries a roller 261 working in a cam groove 262 formed in a cam member 263 secured to the shaft 17.

The carriage 254 is provided with a forwardly-extending bifurcated arm 264 in which is pivotally mounted the initial folding blade 265, said blade being weighted at its rear end, as for instance, by the blocks 266, so that normally the front edge of the blade is thrown upwardly and as the carriage is advanced will strike the liner at a point considerably above the top of the can 192 (see Fig. 50), and will tend to turn said edge of the line inwardly and downwardly. As the carriage is fully advanced the under face of the blade 265, in rear of the pivot of said blade, comes in contact with the cross-bar 267, see Fig. 50, which tends to rock said blade and throw the forward edge thereof downward into the position shown in Fig. 53.

The carriage 254 also forms the support for two oscillating shafts 268 and 269, each of which at its forward end carries an end folder, comprising two L-shaped arms 270, 271, the arms extending inwardly toward each other and being flat upon their under faces, as will be best seen upon reference to Fig. 52. The shafts 268 and 269 at their rear ends each carry a pinion 272 between which there is mounted a double rack 273 adapted to be moved up and down in its way or guide by a link 274, pivoted to the lower end of said rack and likewise connected at its lower end to a lever 275, which carries a roller 276 (Fig. 49) which works in a cam groove 277, formed in the cam member 263.

The cam grooves 262 and 277 are so timed that after the carriage is moved inwardly and the upwardly-inclined blade 265 has been brought to final folding position, as in Fig. 53, to form a fold such as shown in Fig. 54, the end folding arms are turned inwardly, whereby the upper ends thereof strike the upstanding ends of the liner and turn the same downwardly over the blade 265, coming to the position shown in Fig. 55 and forming the end folds, as shown in Fig. 56. When this is completed the carriage begins its retreat or rearward movement, the blade or plate 265 being withdrawn from beneath the infolded ends of the liner and simultaneously the device for folding the remaining upstanding side of the liner is brought to position. Secured upon the support 253 are upstanding overhanging brackets 278, in which is journaled a shaft 279, secured to one end of which (see Figs. 46 and 47) is an arm 280, said arm in turn being connected to a link 281 which extends downwardly through the table-top 2 and is connected at its lower end to a lever, 282, which carries a roll 283, working against a cam 284 adjustably mounted upon a disk 285, secured to shaft 17, see Fig. 47. A spring 284ª tends to hold the roll against the cam. Through this mechanism an oscillating motion is imparted to shaft 279 which has secured to it a downwardly-extending bracket 286, the lower end of which is bifurcated or provided with ears, and a rod 287 is mounted in said ears and passes loosely through a lug 288 secured to a folder plate of the form best shown in Figs. 47, 50, and 57. It is formed of sheet metal and comprises two members, 289 and 290, standing at right angles to each other, the lug 288 extending from the former. A spring 291 encircles rod 287, one end thereof being secured to the bracket 286 and the other bearing upon plate 289, tends to throw said folder forwardly into the positions shown in Figs. 47 and 58, the upper portion of the plate then coming into contact with the end of a stop screw 292, which limits its inward movement. As the bracket 286 is swung inwardly, the plate 289 (which is then in a substantially upright position) will contact with the upstanding member of the liner and force the same into contact with the arms 270, 271. The spring 284ª at such time holds the folder closely against the arms (cam 284 riding away from the roller 283), whereby the upstanding side of the liner is creased along the sharp edge of the arms 271. As the carriage 254 retreats, the bracket 286 will be swung inwardly to its full extent through the action of spring 284ª, and finally the folder will come to the position shown in Figs. 46, 47 and 58, whereby the lower part 290 of the folder will finally close the upstanding edge upon the other infolded portions of the liner.

When the final folder has reached its limit of inward movement, the carriage will have been fully withdrawn and the initial and end folders will come to the positions shown in Fig. 47. At this time the bracket 286 and the final folder carried thereby come to rest and the can-carrying turret starts on another eighth revolution, carrying the can with the liner which has just been folded from beneath the final folder and beneath a down-hold 293, (Figs. 46 and 49) which is secured to one of the brackets 278, and overlies the path of travel of the can to the next mechanism, namely, the lid-closing structure. As will be seen upon reference to Figs. 47 and 50, the forward end of the plate 290 is given a slight upward curve, this for the reason that should a can-top 193 be thrown upwardly for any cause, it will contact with the curved portion and be drawn downwardly out of the way of the inward advance movement of said final folder, where the coupon or insert mechanism, before described, is not employed. This is probably unessential, but if said mechanism, and particularly the lid-positioning device referred to in connection therewith, be not present the curvature of the plate 290 may become important.

*Lid-closing mechanism.*

This mechanism is best shown in Figs. 3 and 4 and in detail in Figs. 59 to 66 both inclusive. Secured to the top 2 is a stand or support 294, provided at its upper end and to one side with two laterally-extending arms 295 and 296 between which, upon a cross-pin or shaft 297, is fulcrumed a rocking carrier of the form best shown in Figs. 61 and 64, said carrier above its hub having a U-shaped arm 298, while below the hub there is a relatively flat block or plate 299. The end of the member 298 is pivotally connected to a vertically-disposed bar 300, from the lower end of which extends a rod 301 which at its lower end is pivotally connected to the free end of a lever 302 fulcrumed upon rod 248, which lever carries a roll 303 bearing upon a cam 304, which is secured to a disk or hub member 305, secured to shaft 17. A spring 306, connected to the member 300, and to the support 294, tends to draw the member 300 downwardly and to keep the roll 303 in contact with the cam. Pivotally mounted upon a cross-pin 307 extending through a hub 308 formed in the lower portion of the member 299 of the carrier, is a frame 309, shown in detail in Fig. 65, the lower end of the frame being provided with a through-pin or shaft 310, and upon each end of the shaft, to the sides of the frame, there is mounted a roller 311, said rollers being adapted to contact with the top of the lid, as hereinafter specified, and finally to close the same. In the opposite end of the member 299 there is mounted a stem 312, carrying a pointed screw 313 adapted, when the lid is closed, to contact with the lid adjacent the hinge and to slightly indent the same, to assist in holding the lid in its final closed position. Secured to a fixed shaft 313ª, carried by the arms 295, 296 and upon the outside of said arm 296, is a member 314, Figs. 59 and 62, the upper face 315 of which is inclined and the forward face curved to conform to the path of travel of the can as it is advanced by the can-turret. The cam, as will be seen upon reference to Fig. 59, underlies the rearwardly turned lid, and will swing said lid upwardly and forwardly, as shown in the advanced position of the can in said figure, so that the can-lid will come to the position shown in Fig. 60, as it reaches the lid-closing devices. Pivotally mounted between the outer ends of the arms 295 and 296 is a member 316, having two curved and downwardly-extending fingers 317, 318. This frame is normally drawn toward the can-lid by springs 319 connected by pins 320 upon the member 316, and at their opposite ends connected to pins 321 carried by the roller frame 309. A slide 322, see Figs. 60, 61 and 66, is mounted in an opening or guide-way formed in the support 294 and extends forwardly in a horizontal direction in line with the upper portion of the can. Said slide is connected to a bell-crank lever 323, the inner end of which underlies a hub 324, which is carried by the member 298, and a spring 325 holds said lever in contact with the hub, and tends at all times to protrude the slide forwardly into contact with the can-body. A stop-screw 326 is provided to limit the inward movement of the slide.

In operation, the cans are advanced from the folding mechanism and come into contact with the member 314 which turns the lid upwardly and over, as above described. The can, with its lid thus partially closed, comes to rest in the position shown in Fig. 60, whereupon by an upward movement of the rod 301 and the bar 300, the carrier member 298 is rocked, bringing the ends of the fingers 317 and 318 against the rear of the lid and tending to draw the same downwardly, while at the same time the slide 322 is projecting forwardly and acts upon the front face of the can. The points of contact of the fingers 317, 318 are separated and the slide 322 acts upon the front of the can at a point intermediate the pressure of said fingers, and the front face of the can is forced in slightly in order that the lid may be readily closed. As the fingers and slide come into contact with the lid and can-body, the rollers are carried forwardly, and passing over the lid force the same downwardly into its fully closed position. The fingers, of course, come to rest, and, as they are merely held against the rear of the lid by spring pressure exerted by springs 319 and while the roller frame 309 is carried forward by the arm 298, if for any reason the lid should not be in a position to close, said rollers will swing upwardly sufficiently to relieve the lid of any pressure which would otherwise damage it. As the lid reaches its closed position, the pointed end of screw 313 comes into contact with the hinge of the lid and as before noted slightly indents the same to assist in holding the lid in its closed position.

Discharge mechanism.

After the retracting of these parts the closed can is advanced another eighth turn and comes to rest in line with the discharge table or runway 327, see Figs. 4 and 35. At this point there is located a take-off member for the completed package and closed can, comprising two arms or fingers 328, secured to a frame 329 fulcrumed upon a vertically-disposed post 330, a lever 331 extending outwardly from the frame and being connected by a link or draw-rod 332 to the upper end of a bell-crank lever 333 fulcrumed upon a stud 334 (Fig. 5). The lower arm of said bell-crank lever carries a roller which works in a cam 335 secured to the shaft 17. The fingers 328 are adapted to straddle the outwardly projecting members of the pocket 30 and to pass in rear of the can as it comes into position in line with the runway 327. As the turret comes to rest the cam 335 rocks the fingers, through the connections above described, and the can and those which preceded it, are forced outward onto the runway, clear of the turret.

Plunger-wiper.

In the packing of certain materials, and particularly tobacco, the charge is apt to adhere to the lower end of the ejector plunger 196, and to prevent this I provide a wiping mechanism for the lower end of said plunger, best shown in Figs. 1, 2, 3 and 67. Extending outwardly from the hub 58 is a lug 336 (Fig. 67) to which is fulcrumed a lever 337, urged upward by a spring 338, interposed between its lower face and the upper face of the turret member 57. The outer end of the lever is pivotally connected to a hollow box 339, from the upper face of which projects a wick adapted to contact with and wipe off the lower face of the plunger, the box preferably containing a mixture of any suitable substances, such for instance as glycerin and rum. A slide 340 is secured to the box and finds its bearing, at the lower end, in the member 57. A roller 341 is secured upon the upper side of the lever 337, said roller lying in the path of movement of a cam 342. Said cam, as will be seen upon reference to Fig. 1, is supported from the bracket 81 and is open at one side, between the up-turned terminals thereof, 343. In other words, the cam has the form of an open ring, which lies in the path of the roller 341. As it passes out from one end it comes into contact with the under face of the plunger, wipes the same clean and then passes under the opposite end of the cam and is lowered out of operative position.

It is thought that from the foregoing description the operation of the machine will be fully understood without a complete résumé thereof. It is to be borne in mind that the apparatus in the broad aspect of my invention is not limited to the precise details herein set forth, and that the machine may be adapted to handle cans of any desired cross-section instead of cans which are slightly bowed in form, as shown in the present instance. Thus, for example instead of employing tucking mechanism for closing the lower end of the liner, I might use a folding mechanism of any approved type, or of the type shown to fold the upper end of the liner.

So, too, instead of forming liners, I may use a previously-formed bag or receptacle, in which case the liner-forming and tucking mechanisms would be done away with and a bag-positioning mechanism such, for instance, as that shown in Letters Patent No. 1,114,256, granted to me under date of October 20, 1914, substituted therefor. The more generic claims are, therefore, not to be limited in their scope to the use of a liner or wrapper or the mechanism for producing the same.

It is also to be understood that while the machine herein set forth is especially adapted for use in connection with cans having hinged lids, certain of the parts or mechanisms may be employed with cans or other receptacles having detached covers or lids; thus, for instance, the liner-forming devices, the tucking mechanism, the charge-compressing mechanism, and the final folding mechanism, could as well be employed with a can having a detached lid as with one provided with a hinged lid, and certain of the claims are to be read and construed with this in view.

No claim is made herein to the can-lid closing mechanism except as to the form disclosed and, also, in combination with other features, the generic invention directed to the can-lid closing mechanism forming the subject-matter of a co-pending application filed on or about December 1st, 1914, Serial No. 875,016.

Having thus described my invention, what I claim is:

1. In a machine for packing material in containers, the combination of charge-feeding mechanism; automatic liner-forming mechanism; automatic mechanism for placing a charge of material in said liner and a container positioned over the liner; means for closing the container; and intermediate connections whereby the several mechanisms are caused to perform their operations in proper time and sequence without interference.

2. In a machine for packing material in containers, the combination of automatic means for forming a liner and closing one end thereof; automatic means for placing a charge of material in said liner and a container positioned over the liner; means for closing the other end of the liner; means for closing the container; and intermediate connections whereby the several mechanisms are caused to perform their operations in proper time and sequence without interference.

3. In a machine for packing material in a container having a hinged lid, the combination of automatic means for placing a charge of material in the container; means for placing an insert or coupon in the lid; and means for closing the lid upon the body of the container.

4. In a machine for packing material in containers, the combination of automatic means for forming a liner into tubular form; automatic means for closing the lower end thereof; automatic means for placing a charge of material in said liner and in a container positioned over the liner; means for closing the upper end of said liner; means for closing the container; and intermediate connections whereby the several means are caused to perform their operations in proper time and sequence without interference.

5. In a machine for packing material in a container having a hinged lid, the combination of automatic means for forming a liner into tubular form; automatic means for closing the lower end of the liner; automatic means for placing a charge of material in said liner and in a container positioned over the liner; means for closing the upper end of the liner; means for placing a coupon in the open lid; means for closing the lid; and intermediate connections whereby the several means are caused to perform their operations in proper time and sequence without interference.

6. A liner-forming mechanism for packing machines, comprising a form; means for wrapping a liner sheet about the same; and an associated mechanism for closing the lower end of the liner, embodying means for grasping the opposite sides of the lower portion of the liner, bringing them together, and then carrying such grasped portions upwardly into the form.

7. A liner-forming mechanism for packing machines, comprising a tubular form; means for wrapping a sheet of paper about the same; and an associated mechanism for tucking the lower end of the sheet into the lower end of the form to close the lower end of the liner.

8. A liner-forming mechanism for packing machines, comprising a tubular form; means for wrapping a sheet of paper about the same; and an associated mechanism adapted to grasp the lower end of the sheet and to carry it upwardly into the lower end of the form and in so doing to fold it upon itself.

9. A liner-forming mechanism for packing machines, comprising a tubular form; means for wrapping a sheet of paper about the same; means for temporarily holding the overlapped edges of the sheet; and an associated mechanism adapted to tuck the lower end of the sheet into the lower end of the form.

10. A liner-forming mechanism for packing machines, comprising a form; means for holding a sheet of paper adjacent thereto; and means for wrapping a sheet about said form, comprising folder blades and a flexible band adapted to be carried by said blades into contact with the sheet and to cause said band to draw the sheet into close contact with the form.

11. A liner-forming mechanism for packing machines, comprising in combination a form; means for supporting a sheet adjacent thereto; means for carrying the sheet from said support and holding it against the form; and means for wrapping the sheet about the form, comprising a pair of folders adapted to carry the edges of the sheet about the edges and front face of the form, and a pair of flexible bands attached to the folders, extending from one to the other in rear of the sheet and form, and adapted to be carried by the folders into contact with the sheet and to draw the sheet into close contact with the form.

12. A liner-forming mechanism for packing machines, comprising in combination a form; means for supporting a sheet adjacent thereto; means for carrying the sheet from said support and holding it against the form; means for wrapping the sheet about the form, comprising a pair of folders adapted to carry the edges of the sheet about the edges and front face of the form, and a pair of flexible bands attached to the folders, extending from one to the other in rear of the sheet and form, and adapted to be carried by the folders into contact with the sheet and to draw the sheet into close contact with the form; and means for holding the overlapped edges of the liner in place.

13. A liner-forming mechanism for packing machines, comprising in combination a form; means for supporting a sheet adjacent thereto; means for carrying the sheet from said support and holding it against the form; means for wrapping the sheet about the form, comprising a pair of folders adapted to carry the edges of the sheet about the edges and front face of the form, and a pair of flexible bands attached to the folders, extending from one to the other in rear of the sheet and form, and adapted to be carried by the folders into contact with the sheet to draw the sheet into close contact with the form; means for holding the overlapped edges of the liner in place; and a spring-pressed finger adapted to contact with the overlapped portion of the liner and to temporarily hold the same in place.

14. A liner-forming mechanism for packing machines, comprising in combination a form; means for temporarily supporting a sheet adjacent thereto; a plunger adapted to be moved forward to hold the sheet against the form; a pair of folding blades arranged adjacent the form; a pair of flexible straps connected to the outer faces of the blades and extending from one blade to the other in rear of the sheet; means for swinging said blades forwardly in front of the form and thereby causing the straps to hug the sheet closely to the form; and means for holding the sheet in place when so wrapped.

15. A liner-forming mechanism for packing machines, comprising in combination a form; a temporary support for a sheet consisting of oppositely-disposed channel members, a cross bar, and sheet-sustaining members carried thereby; a reciprocating plunger adapted to move the sheet forwardly and to hold it against the form; a pair of oscillating shafts; a folder carried by each shaft; a pair of flexible straps connected to the outer face of each folder and extending across from one to the other in rear of the sheet; means for actuating said shafts; means for advancing and retracting the plunger; and means for holding the sheet in place when the plunger and folders are withdrawn.

16. In a machine for packing materials in a container, the combination of a hollow form; means for wrapping a liner about the same; means for temporarily holding the liner in place when so wrapped and permitting a container to be slipped over the liner; and means for transferring a charge of material to said liner and container, through the form, and stripping the liner and container from the form.

17. In a machine for packing materials in a container, the combination of a form; means for wrapping a liner about the same; means for temporarily holding such wrapped liner and permitting the placement of a container over the liner; and means for stripping the liner and container from the form.

18. In a machine for packing materials in a container, the combination of a hollow form; means for wrapping a liner about the same; means for holding a container in place upon said liner; and means for forcing a charge of material into said form and into contact with the lower portion of the liner, and withdrawing the form from between said charge and the liner.

19. In a machine for packing materials in a container, the combination of a form; means for wrapping a liner about the same; a spring-pressed finger adapted to hold the liner in place; a latch for holding said finger away from the form; means for releasing the latch when the liner is wrapped around the form; and means for tucking in one end of the liner to close the same.

20. In a machine for packing materials in a container, the combination of a form; means for wrapping a liner about the same; a finger adapted to bear against the overfolded edges of the liner to hold the same folded edges of the liner to hold the same in place; a latch for holding said finger out of action while the wrapping of the liner is being effected; means for releasing said latch and permitting the finger to contact with the liner when the wrapping is completed; and means for closing one end of the liner while it is thus held.

21. In a machine for packing materials in a container, the combination of a form; means for wrapping a liner about the same; a finger adapted to bear against the overfolded edges of the liner to hold the same in folded edges of the liner to hold the same in place; a latch for holding said finger out of place; a latch for holding said finger out of action while the wrapping of the liner is being effected; and means for releasing said latch and effecting an easy contact of the finger with the wrapped liner.

22. In a machine for packing materials in a container, the combination of a hollow form; means for wrapping a liner about said form; a finger adapted to hold the wrapped liner in place; a latch for holding the finger away from the liner; means for releasing the latch when the wrapping action is completed; and a plunger for cleaning the interior of the form.

23. In a machine for packing materials in a container, the combination of a charge-compressing chamber, a hollow form depending therefrom; means for wrapping a liner about the same; means for holding said liner and a container slipped thereon; means for discharging a charge from the compressing chamber into said form; and means for withdrawing the form from the container and liner while the charge is held fixed with reference to the liner and container.

24. In a machine for packing materials in a container, the combination of a hollow form; means for wrapping a liner about the same; a U-shaped frame pivotally supported adjacent said form; a finger carried by the frame and adapted to contact with the wrapped liner; a spring normally swinging said frame to throw the finger into contact with the liner; a latch for said frame; a cross-head; means for raising and lowering said head; and a pair of rods extending downwardly from said head, one of said rods acting to release the latch and the second rod contacting with the frame and controlling its movement as it swings to throw the finger into contact with the liner.

25. In a machine for packing materials in a container, the combination of a rotatable turret; means for raising and lowering the same; a plurality of forms carried thereby; means for wrapping a liner about each form; and means acting, when the turret descends, to grasp the lower end of the adjacent liner, to force the sides thereof together, and to tuck the same into the lower end of the form.

26. In a machine for packing materials, the combination of an endwise reciprocable form; means for wrapping a liner about the same; and means acting, when the form nears its limit of movement in one direction, to grasp the free end of the liner, to carry the sides thereof into contact with each other, and finally up into the end of the form.

27. In a machine for packing materials, the combination of an endwise reciprocable form; means for wrapping a liner about the same; and a spring-sustained liner-closing mechanism located in line with said form and adapted to yield under abnormal working conditions.

28. In a machine for packing materials, the combination of an endwise reciprocable form; means for wrapping a liner about the same; a pair of tucking fingers adapted to grasp the lower end of the liner as the form is lowered; and means for swinging said fingers into grasping position as the form nears its limit of downward movement, whereby the liner will be folded or doubled upon itself and carried upwardly into the form.

29. In a machine for packing materials, the combination of an endwise reciprocable form; means for wrapping a liner about the same; a pair of pivotally mounted fingers, the free ends of which stand upon opposite sides of the path of movement of the form; and means for swinging said fingers into grasping relation with the lower end of the liner as the form approaches the same.

30. In a machine for packing materials, the combination of a form; means for wrapping a liner about the same; and means for grasping and tucking one end of said liner into the form to close said end of the liner.

31. In a machine for packing materials, the combination of a form; means for wrapping a liner about the same; and means for plaiting one end of the liner upon itself and simultaneously carrying such end into one end of the form.

32. In a machine for packing materials, the combination of an endwise reciprocable form; means for wrapping a liner about the same; a spring-sustained support located in line with the form; a pair of fingers pivotally mounted on said support; and means for causing said fingers to swing inwardly and grasp the end of the liner as the form approaches said fingers and to maintain such position while the form passes over the same and again retreats.

33. In a machine for packing materials, the combination of a form; means for wrapping a liner about the same; mechanism for closing the lower protruding end of the liner; and means for holding a receptacle which may be slipped over the liner and form.

34. In a machine for packing materials, the combination of a form; means for wrapping a liner about the same; and means adapted initially to hold the liner in its wrapped position and to subsequently hold a can which may be slipped over the liner sustained by the form.

35. In a machine for packing materials, the combination of a form; means for placing a wrapper thereon; means for holding a can which may be slipped over the form; and means for pushing said can to place with reference to the form.

36. In a machine for packing materials, the combination of means for packing a charge of material in a container having a hinged lid; means for placing a coupon in the lid; and means for closing the lid.

37. In a machine for packing materials, the combination of means for packing a charge of material in a container having a hinged lid; means for turning the lid outwardly; and means for placing a coupon in said out-turned lid.

38. In a machine for packing materials, the combination of means for packing a charge of material in a container having a hinged lid; means for positioning the lid; means for placing a coupon in said lid; and means for closing the lid.

39. In a machine for packing materials, the combination of means for packing a charge of materials in a container having a hinged lid; means for turning the lid into a substantially horizontal position; means for depositing a coupon in said lid; means for turning the lid upwardly and over the container body; and means for finally closing the lid.

40. In a machine for packing material, the combination of means for packing material encompassed by a liner within a can having a hinged lid; means for placing a coupon in the lid of the container; means for folding the top of the liner; and means for closing the lid.

41. In a machine for packing materials in a can having a hinged lid, the combination of means for placing a coupon in the lid while thrown open; and means for subsequently closing the lid.

42. In a machine for packing materials in a can having a hinged lid; the combination of means for placing a liner and charge of material contained thereby in a can body with the end of the liner protruding upwardly; means for folding the protruding end of the liner inwardly over the material; and means for subsequently closing the lid.

43. In a machine for packing materials in a can having a hinged lid, the combination of means for placing a liner and charge of material in the can body, with the upper end of the liner protruding; means for placing a coupon in the lid; means for folding the upstanding end of the liner; and means for closing the lid.

44. In a machine for packing materials in a can having a hinged lid, the combination of means for advancing cans, one by one; a cam adapted to position the lids; and a coupon-feeding mechanism adapted to place a coupon in each lid.

45. In a machine for packing materials in a can having a hinged lid, the combination of means for advancing cans, one by one; a cam-shaped member standing in line with a partially opened lid; and means for placing a coupon in said lid.

46. In a machine for packing materials in a can having a hinged lid, the combination of means for advancing cans, one by one; a coupon-strip severing device; and means working in conjunction therewith to deflect the severed coupon into the lid of the can positioned with relation thereto.

47. In a machine for packing materials in a can having a hinged lid, the combination of means for advancing cans one by one; a coupon strip severing device; and a deflector plate overlying the severed coupon and the open lid, and adapted to deflect said coupon into the lid.

48. In a machine for packing materials in a can having a hinged lid, the combination of means for advancing cans one by one; a coupon strip severing device; a deflector plate overlying the coupon to be severed and likewise standing in line with the open lid; and means for moving said deflector plate in unison with the strip-severing device.

49. In a machine for packing materials in a can having a hinged lid, the combination of means for advancing cans one by one; means for holding a strip of coupons; means for feeding the strip forwardly and protruding the end of the strip over the can-lid; a knife adapted to sever such protruding end of the coupon; and a deflector plate movable with the knife and adapted to deflect the severed coupon into the lid.

50. In a machine for packing materials in a can having a hinged lid; the combination of means for supporting a strip of coupons; means for feeding the strip forwardly step by step, and carrying the end coupon into line with the open lid; a reciprocating bar located above the lid; means for actuating the same; and a spring presser, a knife and a deflector mounted upon the lower end of the bar and adapted to clamp the strip, to sever the end coupon, and to deflect the same into the open lid.

51. In a machine for packing materials in a container, the combination of means for placing a charge of material and a liner in a container with the upper end of the liner protruding above the upper end of the container; a carriage movable toward and from the container and the upstanding portion of the liner; means mounted upon said carriage for infolding the adjacent side of the upstanding liner; a pair of end folders also mounted on the carriage; means for actuating said side folders as the carriage reaches its limit of outward movement; and a spring-actuated side-folder adapted to turn down the remaining upstanding side of the liner upon the retraction of the carriage and the folding devices carried thereby.

52. In a machine for packing materials in a container, the combination of means for placing a charge of material and a liner therefor in the container, with the upper end of the liner protruding above the upper end of the container; a carriage movable toward and from the container and the liner; a pivoted plate supported upon the carriage; means for holding the forward end of said plate in an upwardly inclined position; a fixed member adapted to tilt said plate after it has contacted with the upstanding side of the liner; a pair of oppositely-disposed fingers supported by the carriage; means for throwing said fingers inwardly and downwardly and thereby infolding the ends of the liner; a swinging bracket adapted to be moved inwardly over the remaining upstanding edge of the liner; and a spring-actuated folder carried by the bracket and adapted, upon retraction of the carriage and the folding members supported thereby, to infold said remaining upstanding side.

53. In a machine for packing materials in a container, the combination of means for placing a charge of material and a liner in a container, with the liner protruding upwardly above the container; a carriage movable toward said container and liner; a plate pivotally supported by said carriage forward of its center of gravity whereby the plate will normally lie in an inclined position with its forward edge elevated; a fixed member adapted to coact with said plate as the carriage reaches its limit of forward movement, whereby the forward edge of the plate will be thrown downwardly and the upstanding side of the liner will be folded down; a pair of shafts mounted upon and movable with said carriage; means for imparting an oscillating motion to said shafts; a finger carried by each shaft, said fingers normally standing in an upright position and adapted to be thrown downwardly toward each other and into contact with the upstanding ends of the liner after the initial fold has been made; a bracket mounted to swing over the container and liner; an L-shaped spring plate pivotally mounted on the lower end of said bracket; and a spring normally urging said plate forwardly to turn the remaining upstanding side of the liner down upon the other infolded portions upon the retraction of the carriage and the parts supported thereby.

54. In a machine for packing materials in cans having hinged lids, the combination of means for placing a charge of material and a liner in a can-body with the upper end of the liner extending above the upper end of the can; means for folding one upstanding edge and the ends of the liner inwardly; and a plate for folding the remaining upstanding edge of the liner inwardly, said plate having one edge curved and normally lying in the path of movement of the can lids, whereby should a lid be out of position it will contact with said curved portion and be deflected downwardly.

55. In a machine for packing materials in a can having a hinged lid, means for closing the lid, comprising in combination means for initially bringing the lid to a partial closed position, and a rolling device movable transversely across the upper surface of the can-lid, and adapted by such movement to force the same to closed position.

56. In a machine for packing materials in a can having a hinged lid, lid-closing means comprising in combination means for partially closing the lid, and a pair of rollers movable across the lid and adapted to press the lid to fully closed position.

57. In a machine for packing materials in a can having a hinged lid, means for closing the lid comprising in combination means for partially closing the lid; a frame movable across the lid, and a pair of rollers carried by the lower end of the frame and adapted to contact with the lid and to force the same into its fully closed position.

58. In a machine for packing materials in a can having a hinged lid, the combination of a frame; a pair of rollers carried by said frame; a swinging supporting and actuating member for said frame; and a spring serving to swing the frame and hold the rollers in contact with the upper face of the lid.

59. In a machine for placing coupons or the like in a can having a hinged lid, the combination of means for placing a coupon in the lid while thrown open; and means for introducing cans with open lids to said coupon-placing means.

60. In a machine for placing coupons or the like in a can having a hinged lid, the combination of means for placing a coupon in the lid; means for introducing cans with open lids to said means; and means for subsequently closing the lids.

61. In a machine for packing materials in a can having a hinged lid, the combination of means for initially and partially closing the lid; means for holding the lid in such position; a slide movable into contact with the forward face of the can to slightly force the same inwardly; and roller mechanism movable across the can-lid to force the same into its closed position.

62. In a machine for packing materials in a can having a hinged lid, the combination of lid-closing mechanism; and an indenter adapted to indent the lid after the same is closed.

63. In a machine for packing materials in a can having a hinged lid, lid-closing mechanism comprising in combination means for tilting the lid into partially closed position, a slide arranged to contact with the forward face of the can to force the same inwardly, a swinging carrier, a spring-sustained pivoted frame mounted upon said carrier, and a pair of rollers supported by the lower end of said frame and adapted to contact with the lid as the carrier is swung over the can.

64. In a machine for packing materials in a can having a hinged lid, the combination of means for tilting the lid into a partially closed position; and lid-closing mechanism comprising in combination a swinging carrier, a roller-carrying frame fulcrumed thereon, a member pivotally supported upon a fixed portion of the machine and standing rearwardly of the can and adapted to contact with the lid of the can adjacent the hinge thereof, a spring connection between said member and the roller-carrying frame, and means for slightly forcing the forward face of the can inwardly.

65. In a machine for packing materials in a can having a hinged lid, the combination of means for tilting the lid into a partially closed position; and lid-closing mechanism comprising in combination a swinging carrier, a roller-carrying frame fulcrumed thereon, a member pivotally supported upon a fixed portion of the machine and standing rearwardly of the can and adapted to contact with the lid of the can adjacent the hinge thereof, a spring connection between said member and the roller-carrying frame, an indenter carried by the swinging carrier, adapted to contact with the hinge portion of the lid, and means for slightly forcing the forward face of the can inwardly.

66. In a machine for packing materials in a container, the combination of a plunger adapted to force the material into the container; and a wiping mechanism for the lower end of the plunger, comprising a pivoted lever, a wiper carried at the outer end of the lever, and a cam for forcing said lever downwardly out of the path of movement of the plunger after the wiper has passed into contact with the lower end thereof.

67. In a machine for packing materials in a container, the combination of a turret; a charge-forming device carried thereby; a plunger adapted to force the charge from said devices into a container; means for rotating the turret; means for raising and lowering the plunger; and a wiper mechanism for the plunger, comprising a lever pivoted at its inner end, a spring normally urging the outer end of said lever upwardly, a reservoir carried at the outer end of said lever, a wiper mounted therein, and a cam adapted to lower said lever out of line with the plunger after the wiper has passed into contact with and beneath the same.

68. In a machine for packing materials in a container having a hinged lid, the combination of a turret; means for rotating the same step by step; means for raising and lowering said turret; a plurality of forms carried by said turret and adapted to receive the material to be packed; means for wrapping a liner about one of said forms; means for closing the lower end of the liner; means for holding a container which may be slipped over said liner in position with reference to said liner and the form; a second turret provided with a plurality of container-receiving pockets; means for forcing a charge of material into the form and stripping the liner with the charge therein from the form and depositing them, with the container, in one of said pockets; means for rotating said second turret step by step; and associated mechanisms operating in conjunction with said second turret to fold the upstanding end of the liner and to close the lid.

69. In a machine for packing materials in a container having a hinged lid, the combination of a turret; means for rotating the same step by step; means for raising and lowering said turret; a plurality of forms carried by said turret and adapted to receive the material to be packed; means for wrapping a liner about one of said forms; means for closing the lower end of the liner; means for holding a container which may be slipped over said liner in position with reference to said liner and the form; a second turret provided with a plurality of container-receiving pockets; means for forcing a charge of material into the form and stripping the liner with the charge therein from the form and depositing them, with the container, in one of said pockets; means for rotating said second turret step by step; and associated mechanisms adapted to place a coupon in the open lid, to close the upper end of the liner, and to thereafter close the lid.

70. In a machine for packing materials in a container having a hinged lid, the combination of a turret; means for rotating the same step by step; means for raising and lowering said turret; a plurality of forms carried by said turret and adapted to receive the material to be packed; means for wrapping a liner about one of said forms; means for closing the lower end of the liner; means for holding a container which may be slipped over said liner in position with reference to said liner and the form; a second turret provided with a plurality of container-receiving pockets; means for forcing a charge of material into the form and stripping the liner with the charge therein from the form and depositing them, with the container, in one of said pockets; means for rotating said second turret step by step; and associated mechanisms for placing a coupon in the open lid, re-pressing the charge, folding the upstanding end of the liner after such re-compression, and finally closing the lid.

71. In a machine for packing materials in containers, the combination of means for forming a paper receptacle; mechanism for placing a charge of material in said receptacle; means for closing a container slipped over said receptacle; and intermediate connections whereby the several means and mechanisms are caused to perform their operations in proper time and sequence without interference.

72. In a machine for packing materials in a container having a hinged lid, the combination of means for forming a paper receptacle adapted to be placed within said container; mechanism for placing a charge of material in said receptacle; means for closing the upper end of the receptacle after the same is placed in the container; means for closing the lid of the container; and intermediate connections whereby the several means and mechanisms are caused to perform their operations in proper time and sequence without interference.

73. In a machine for packing materials in containers, the combination of mechanism for placing a charge of material in a paper receptacle adapted to have a container with a hinged lid slipped thereover; means for placing a coupon in the lid of the container; means for closing the upper end of the paper receptacle; means for closing the lid of the container; and intermediate connections whereby the several means and mechanisms are caused to perform their operations in proper time and sequence without interference.

74. In a machine for packing materials in containers, the combination of mechanism for placing a charge of material in a paper receptacle adapted to have a container slipped thereover; means for closing the upper end of the paper receptacle; means for placing a coupon or the like in the lid of the container; means for closing the lid upon the container; and intermediate connections whereby the several means and mechanisms are caused to perform their operations in proper time and sequence without interference.

75. In a machine for packing materials in containers, the combination of mechanism for placing a charge of material in a paper receptacle adapted to have a container slipped thereover; means for recompressing the charge after the same has been placed in the receptacle; means for closing the upper end of said receptacle; means for placing a coupon or the like in the lid of the container; means for closing the lid upon the container; and intermediate connections whereby the several means and mechanisms are caused to perform their operations in proper time and sequence without interference.

76. In a liner-forming mechanism for packing machines, comprising a form; means for holding a sheet of paper adjacent thereto; means for wrapping a sheet of paper about said form, comprising a pair of folder blades, and flexible tapes connected to and extended from blade to blade; and means for actuating said blades.

77. In a machine for packing materials in containers, the combination of means for placing a charge of material and a liner in a container, with the upper end of the liner protruding above the upper end of the container; means for infolding one side of the liner; means for infolding the ends of the liner; and spring-actuated means for first creasing the remaining upstanding side of the liner and subsequently folding it down upon the other portions of the liner.

78. In a machine for packing materials in containers, the combination of means for placing a charge of material and a liner in a container, with the upper end of the liner protruding above the upper end of the container; means for infolding one side of the upstanding liner; a pair of fingers adapted to infold the upstanding edges of the liner, said fingers presenting a sharp edge adjacent the remaining upstanding side of the liner; means for creasing the remaining upstanding side along said edge; and means for folding said upstanding side inwardly after the same has been creased.

79. In a machine for packing materials, the combination of a folder adapted to infold one side of a liner over the material placed within a container; a pair of inwardly-swinging fingers adapted to contact with the ends of the liner and to fold the same inwardly, said fingers being substantially triangular in cross-section and presenting a sharp edge adjacent the remaining upstanding side of the liner; and a spring-pressed folder plate adapted to contact with the remaining upstanding side to crease it along the sharp edge aforesaid and to finally turn said remaining side inwardly over the other portions.

80. A machine for inserting coupons or the like into receptacles comprising, in combination, a coupon-feeding device; means for introducing receptacles successively thereto; and a guide movable toward the receptacles for directing coupons thereto from said feeding device.

81. A machine for inserting coupons or the like into receptacles comprising, in combination, a coupon-feeding device; means for introducing open-topped receptacles successively thereto; and a downwardly inclined guide movable successively toward the receptacles for directing coupons thereto from the feeding device.

82. A machine for inserting coupons or the like into the open lids of receptacles embodying, in combination, a coupon-feeding device; means for successively introducing receptacles with the lids thereof open to the coupon-feeding device; and a guide for directing coupons from the feeding device into the open lids of the receptacles.

83. A machine for inserting coupons or the like into receptacles comprising, in combination, a coupon-feeding device; means for successively bringing receptacles in operative relation thereto; and a vertically movable, downwardly-inclined member for guiding the coupons from said feeding device to the receptacles.

84. A machine for inserting coupons or the like into receptacles comprising, in combination, a coupon-feeding device; means for successively bringing receptacles in operative relation thereto; and a guide movable to and from a position to direct the coupons from said feeding device to the receptacles.

85. A machine for inserting coupons or the like into receptacles, comprising, in combination, a coupon-feeding device; means for successively bringing receptacles into operative relation thereto; and means located above the path of said receptacles and movable successively toward the latter for directing coupons from the feeding device into the receptacles.

86. A machine for inserting coupons or the like into receptacles comprising, in combination, a coupon-feeding device; means for successively bringing receptacles into operative relation thereto; and means located above the path of said receptacles and movable toward and from the same for directing coupons from the feeding device into the receptacles.

87. A machine for inserting coupons or the like into receptacles comprising, in combination, a coupon-feeding device; means for successively bringing receptacles into operative relation thereto; and a guide located above the path of said receptacles and having means for moving it toward and from the receptacles to direct coupons from the feeding device into the receptacles.

88. A machine for inserting coupons or the like into receptacles comprising, in combination, a coupon-feeding device; means for successively bringing receptacles with open lids into coöperative relation therewith; and a guide located above the path of the receptacles and having means for moving it toward and from the open lids of the receptacles to direct coupons from the feeding device into said lids.

89. In a machine for packing materials in a can having a hinged lid, the combination of can-presenting means; means for feeding a coupon strip so as to project a coupon over each can; and means for severing said projected coupon.

90. In a machine for packing materials in a can having a hinged lid, the combination of can-presenting means; means for feeding a coupon strip so as to project the foremost coupon over the open lid of the can; and means for severing such projected coupon.

91. In a machine for packing materials in a can having a hinged lid, the combination of means for presenting cans with their lids open; means for feeding a coupon strip and projecting the outermost coupon over the open lid; a coupon-severing device; and means for actuating said severing device.

92. In a machine for packing materials in a can having a hinged lid, the combination of means for presenting cans successively; means for holding a strip of coupons; means for feeding the strip forwardly and protruding the end of the strip over the open can-lid; and a knife adapted to sever such protruding end of the coupon-strip.

93. A liner-forming mechanism for packing machines, comprising in combination a form; means for temporarily supporting a sheet adjacent thereto; a plunger adapted to be moved forwardly to hold the sheet against the form; a pair of folding blades arranged adjacent the form; a flexible strap connected to the outer faces of the blades and extending from one blade to the other and in rear of the form; and means for swinging said blades forwardly in front of the form and thereby causing the strap to hug the sheet closely to the form.

94. A liner-forming mechanism for packing machines, comprising in combination a form; means for supporting a sheet adjacent thereto; means for carrying the sheet from said supporting means and holding it against the form; means for wrapping the sheet about the form, comprising folders adapted to carry the edges of the sheet about the edges and front face of the form, and a flexible band attached to the folders, extending from one to the other in rear of the sheet and form, and adapted to be carried by the folders into contact with the sheet to draw the sheet into close contact with the form; means for holding the overlapped edges of the sheet in place; and a spring-pressed finger adapted to contact with the overlapped portion of the sheet and to temporarily hold the same in position.

95. A liner-forming mechanism for packing machines, comprising a form; means for holding a sheet of paper adjacent thereto; and means for wrapping a sheet about said form, comprising folder blades and flexible means adapted to be carried by said blades into contact with the sheet and to cause said means to draw the sheet into close contact with the form.

96. A liner-forming mechanism for packing machines, comprising in combination a form; means for temporarily supporting a sheet adjacent thereto; a pair of swinging folding blades arranged adjacent to the form; a flexible band or strap extending from one blade to the other and in rear of the form; and means for first swinging one blade and then the other forwardly and in front of the form, whereby the strap or flexible member will be drawn against the sheet and the sheet forced into close or intimate contact with the form, and the edges of the sheet overlapped.

In testimony whereof I have signed my name to this specification in the presence of two subscribing witnesses.

GEORGE W. GWINN.

Witnesses:
  HORACE A. DODGE,
  EDWIN S. CLARKSON.